United States Patent [19]

Miwa et al.

[11] 3,806,881

[45] Apr. 23, 1974

[54] MEMORY ARRANGEMENT CONTROL SYSTEM

[76] Inventors: Osamu Miwa, No. 24-33-8 Sonan, Sagamihara; Norio Inui, No. 11-8-417 Nishi-cho, Isogo-ku, Yokohama; Keiichiro Uchida, No. 1-21-25 Fujigaoka, Midori-ku, Yokohama, all of Japan

[22] Filed: Oct. 6, 1972

[21] Appl. No.: 295,699

[30] Foreign Application Priority Data

Oct. 6, 1971 Japan .............................. 46-78521

[52] U.S. Cl. .............................................. 340/172.5
[51] Int. Cl. .............................................. G11c 7/00
[58] Field of Search .................................. 340/172.5

[56] References Cited

UNITED STATES PATENTS

| | | | |
|---|---|---|---|
| 3,444,525 | 5/1969 | Barlow et al. | 340/172.5 |
| 3,623,022 | 11/1971 | Day | 340/172.5 |
| 3,505,651 | 4/1970 | Barlow et al. | 340/172.5 |
| 3,505,652 | 4/1970 | Aranyl et al. | 340/172.5 |
| 3,538,502 | 11/1970 | Aranyl et al. | 340/172.5 |
| 3,505,647 | 4/1970 | Torfeh et al. | 340/172.5 |
| 3,387,283 | 6/1968 | Snedaker | 340/172.5 |

*Primary Examiner*—Gareth D. Shaw
*Attorney, Agent, or Firm*—Staas, Halsey & Gable

[57] ABSTRACT

A memory arrangement control system for a memory constructed with a plurality of independently accessible memory units and adapted to be capable of continuously addressing the memory units of a desired integral multiple or fraction of one memory unit, in which the integral multiple or fraction and or a combination of one multiple with the same multiple or a different one, is made variable.

13 Claims, 53 Drawing Figures

4 WAY

MEMORY ARRANGEMENT CONTROL SYSTEM

BACKGROUND OF THE INVENTION

1. Field of the Invention

This invention relates to a memory arrangement control system for changing the arrangement of a memory, and more particularly to a memory arrangement control system which is adapted to respond to an increase or decrease in the number of memory units and or a change in the nimber of interleave.

2. Description of the Prior Art

Generally, in data processing system the overall capacity of a memory is selected in accordance with the scale of the system. The memory is constructed with a plurality of independently accessible memory units, for example, banks in an integrated form. An increase or decrease in the memory capacity due to enlargement of the scale of the data processing system or due to a trouble in the memory, is caused in the number of the independently accessible memory units, that is, the bank units. In a relatively large-scale data processing system, however, the memory capacity sometimes increases or decreases in terms of the number of incorporated modules each having a plurality of banks in an integrated form.

Therefore, it is not desirable to alter an access control unit of the memory in response to each change in the memory capacity and it is desired that a desired address is correctly accessible irrespective of an increase or decrease in the memory capacity.

While, where the bank is considered as a minimum unit independently accessible in the memory, only one address is accessible in the bank at one time. However, recent speeding up of a data processing unit increases the need of parallel reading of the contents of a plurality of addresses and there is the great possibility that the plurality of addresses to be read out in parallel are adjacent or extremely close to each other for convenience of operation.

One conventional addressing method that has been proposed is such that adjacent addresses are not allotted to the same bank; that is, in the case of, for example, four banks, the zeroth, first, second, and third addresses are allotted to the zeroth, first, second, and third banks respectively and then a fourth address is allotted to the zeroth bank, thus ensuring parallel reading of the zeroth and first addresses from the zeroth and first banks.

The number of addresses which can be read out in parallel at one time is commonly referred to as an interleave number and there are 1-way, 2-way, 4-way, 8-way, 16-way and 32-way systems corresponding to the numbers which are accessible in parallel at one time.

In a conventional memory system, the interleave number is fixed but, in general, an optimum interleave number is selected in accordance with a problem to be processed and it is desired that the interleave number can freely be altered in response to a problem to be processed. Especially, memories such as prior art ones in which the interleave numbers are individually fixed according to the types of the memories, are defective in that where a trouble occurs in one bank, normal banks associated therewith cannot be used. Namely, in the case of a memory consisting of, for example, 32 banks in all and having a fixed interleave number of 8wayx4, when one of the banks gets out of order, eight banks including it cannot be used.

Also for the purpose of avoding this, it is desirable to change the interleave number at will to enable the arrangement of the memory to be freely changeable in such manners as, for example, 8-wayx3, 4-way, 2-way and 1-way in the above example. Also in this case, it is desired that a desired address is made correctly accessible as by appropriate processing of address information derived from a data processing unit without changing the access control unit of the memory.

Further, it is also desired that where one bank or module has a capacity of $\alpha$ Kwords, parallel access can be achieved regarding the bank or module as being divided into two banks or modules each having a capacity of $\alpha/2$ Kwords and it is desired to cope with the change at will.

Briefly stated, it is desired in the construction of the memory that the overall memory capacity of the memory is variable, that the interleave number is variable and that the memory capacity of one bank or module is also variable. To this end, it is desired that a predetermined address is correctly accessible in accordance with the arrangement of the memory of appropriate processing of address information given by, for exampe, a data processing unit without changing the memory access control unit.

SUMMARY OF THE INVENTION

It is one object of this invention to control a memory in a manner to cope with the aforementioned changes in the arrangement of the memory.

It is another object of this invention to control a memory in accordance with a change in the overall memory capacity of the memory, a change in the interleave number and a change in the memory capacity of one bank and/or module.

It is another object of this invention to enable the aforementioned control without changing the hard ware arrangement of the memory access unit itself in response to the above-mentioned change in the arrangement of the memory.

It is another object of this invention to effect the aforementioned control only by appropriate processing address information given by the data processing unit.

It is still another object of this invention to correctly select a module and/or a bank containing a desired address in the processing of address information in accordance with the arrangement of the memory employed.

To attain the above objects, in the present invention a memory, which is constructed with a plurality of independently accessible memory units and adapted to be capable of continuously addressing the memory unit of an integral multiple or fraction of one memory unit, is designed such that the integral multiple or fraction and/or a combination of one multiple with the same multiple or a different one, is made variable.

The above objects and other advantages of this invention will become more apparaent from the following description taken in conjunction with the accompanying drawings.

DESCRIPTION OF THE PREFERRED EMBODIMENTS

The capacity of a memory is determined in accordance with a data processing system used but is required to increase or change in response to enlargement of the system and to the occurrence of a trouble in the memory. Further, the memory is required to be prepared for easy change-over of the interleave in accordance with the data processing system or a program to be processed.

Figure 1:
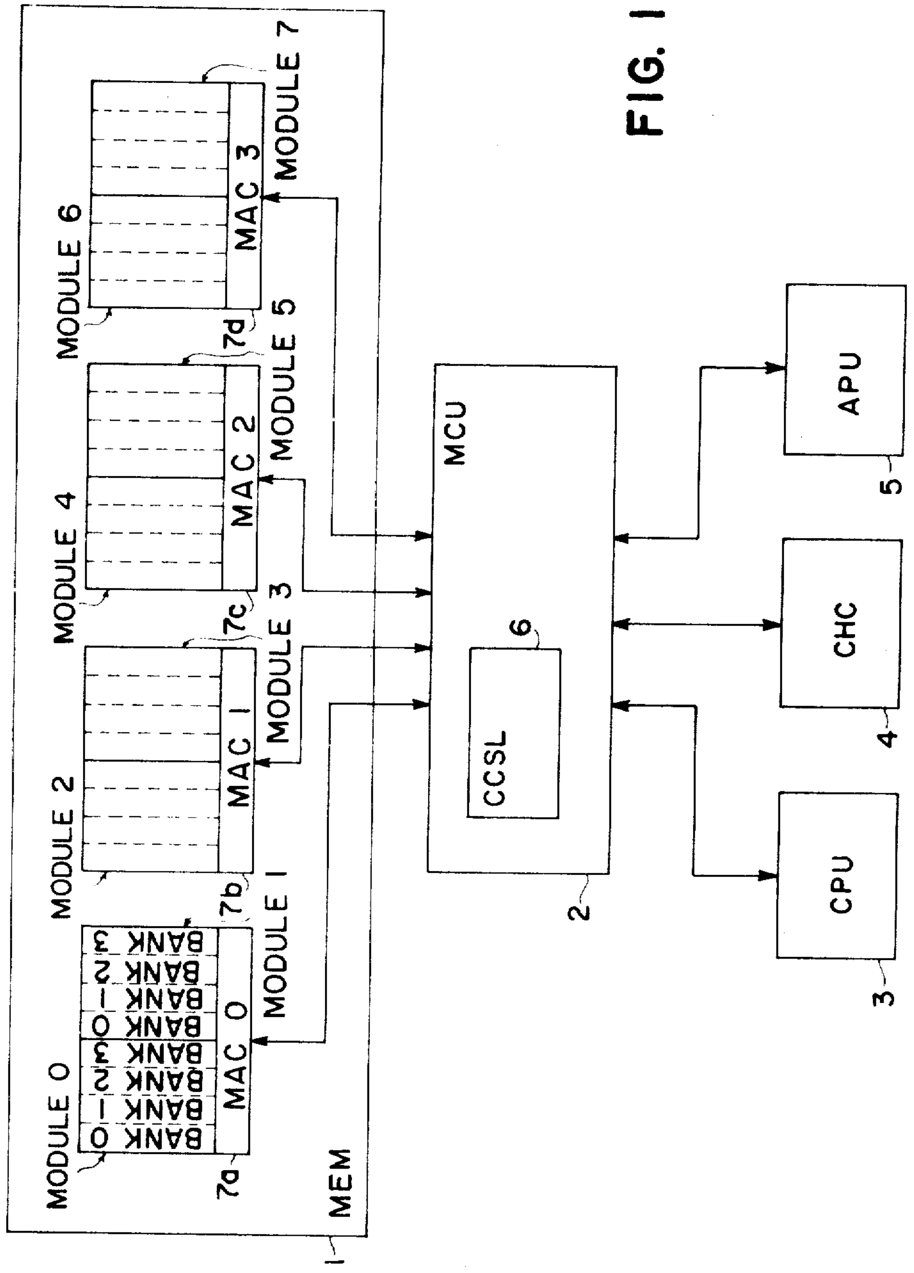
FIG. 1 is a block diagram showing one example of a data processing system to which this invention is applied.

FIG. 1 illustrates one example of a data processing system in which a memory made up of eight modules is accessible by a plurality of data processing units through a memory control unit. In the figure, reference nimeral 1 indicates a memory (MEM), 2 a memory control unit (MCU) and 3 to 5 data processing units, the unit 3 being a central processing unit, the unit 4 a channel control unit and the unit 5 an array processor. Reference numeral 6 designates a system change-over unit (CCSL) and 7a to 7d memory access control units MACO, MAC1, MAC2 and MAC3.

As illustrated in the figure, banks (BANKO, BANK1, BANK2 and BANK3) each having a memory capacity of 32 Kwords, make up one module and the memory 1 is provided with eight modules (MODULEO to MODULE7). The modules (MODULEO and MODULE1) are placed under the control of the memory access control unit 7a and the modules (MODULE6 and MODULE7) are similarly placed under the control of the memory access control unit 7d.

In the illustrated example, it is necessary that in response to access from the data processing unit, for example, the central processing unit 3, the memory control unit 2 achieves a predetermined bit operation irrespective of an increase or decrease in the arrangement of the memory or changeover of the interleave, thereby to make a correct selection of the memory access control unit MAC containing a desired address, that is, a specified module of the unit, and more particularly a specified bank of the module. In order to ensure the correct selection, the memory control unit 2 undergoes a change of bit in response to address information derived from the central processing unit 3 and controls one of the memory access control units based on the address information having the bit changed.

The following will outline the changeover of interleave or an increase or decrease in the memory arrangement.

In FIGS. 2A, 2B, 2C and 2D, reference numerals 7a to 7d designate access control units (MAC). The memory is made up of four access control units MACO, MAC1, MAC2 and MAC3 and eight modules. Each access control unit is adapted to control two modules. The modules will herein after be referred to as MODULE0 to MODULE7. Each module contains 128K addresses (1K being 1,024 addresses and specific addresses are allotted to the modules in such a manner as 0, 1, 2, 3, ...). In the figure, each module is further divided into four banks as will be described in detail later on.

Figure 2A:
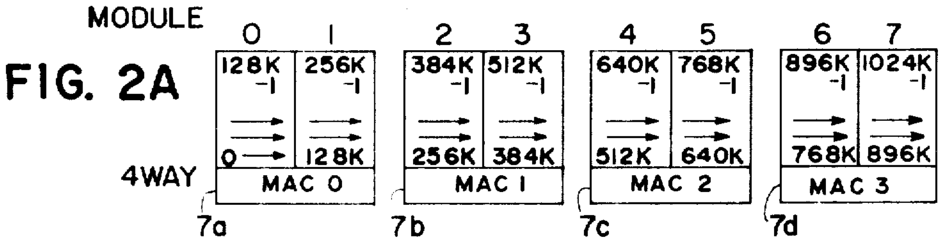
FIGS. 2A to 2D show examples of addressing of a memory by the changeover of interleave, illustrating exmaples such as 4-, 8-, 16- and 32-way interleaves.
Figures 3A, 3B:
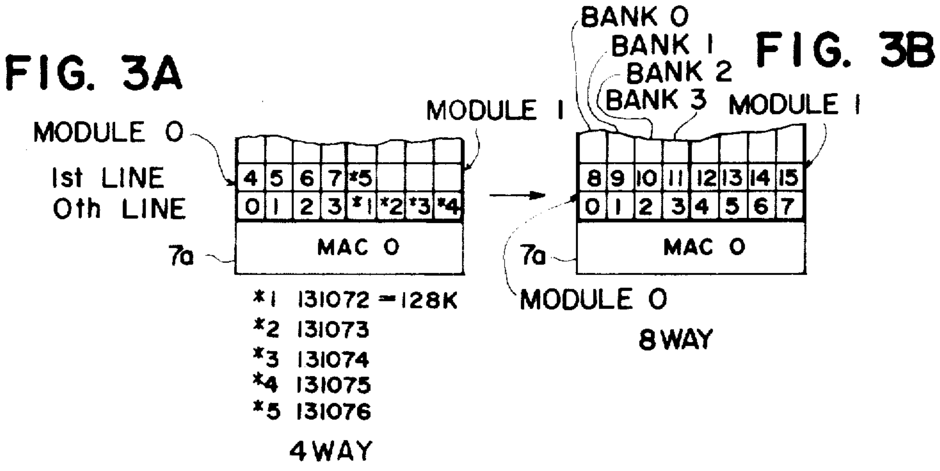
FIGS. 3A and 3B show in detail the addressing in the cases of 4- and 8-way interleaves.

In the case of a 4-way interleave shown in FIG. 2A, the module 0 has allotted thereto addresses from 0 as indicated by an arrow and a last address in the module 0 is 128K-1, that is, 131071 and the module 1 begins with 128K, that is, 131072 and ends with 256K-1. The modules 0 and 1 are placed under the control of the access control unit MACO. Similarly, addresses are allotted to the subsequent modules 2 and 3 and the last address in the module 7 is 1024K-1. The addressing in the 4-way interleave is partly shown in FIG. 3A on an enlarged scale. Since one module contains four banks, four addresses can be read out simultaneously and in the module 0, a first address of a first line (an initiating line being referred to as a 0th line) is 4. In this case, four addresses can be read out at one time, so that this is called 4-way.

Figure 2B:
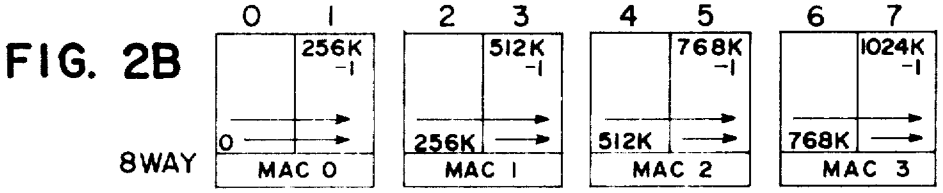

In the case of an 8-way interleave shown in FIG. 2B, addresses are allotted to the modules 0 and 1 in common thereto as indicted by arrows. This is shown in detail in FIG. 3B and a first address of a first line in the module 0 is 8. In this case, the addresses can be read out from eight (4×2) banks arranged side by side, so that this is called 8-way.

Figure 2C:
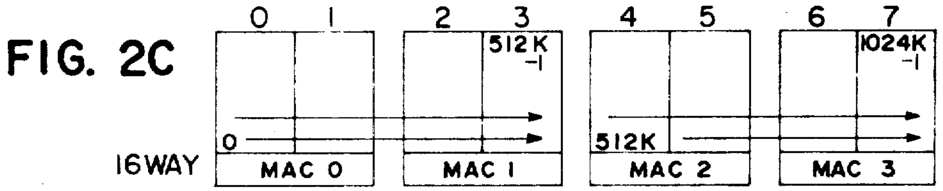
Figure 2D:
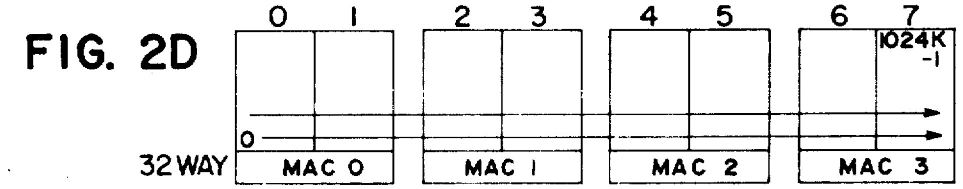

Likewise, in the case of a 16-way interleave shown in FIG. 2C, addresses are allotted to the modules 0 to 3 and those 4 to 7 in common to them respectively, while, in the case of a 32-way interleave shown in FIG. 2D, addresses are allotted throughout the memory, that is, to the modules 0 to 7 in common thereto.

In the case of the 16-way interleave shown in FIG. 2C, the addressing is effected in common to the modules 0 to 3; but, in this case, the memory is designed so that the pairs of modules 0 and 1 and 2 and 3 are separately controlled by the access control units MACO and MAC1 respectively and that the modules 0 to 3 are not accessible in common unless the construction of the access control units is changed. The same is true of the 32-way interleave. For this reason, a bit changing operation such as described later (in connection with FIGS. 7A to 7E) is achieved.

FIGS. 4A to 4H are explanatory of modes of operation of the memory 1 having eight modules in all, shown in FIG. 1, in which various interleave numbers or combinations thereof are selectively adopted in accordance with problems to be processed.

The memory 1 having eight modules in all, depicted in FIG. 1, is driven in a mode of operation with an optimum interleave number in accordance with a problem to be processed. Namely, in the processing of problems, there are some occasions when the interleave number is selected large and the memory is operated in such a manner that a pluraltiy of address contents are written or read out in parallel or when the memory is operated with a combination of, for example, a 16-way interleave for some modules with, for example, an 8-way interleave for the other modules. It is necessary to arrange the system of FIG. 1 readily to respond to such alterations of the memory arrangement.

Figures 4A, 4B, 4C, 4D, 4E, 4F:
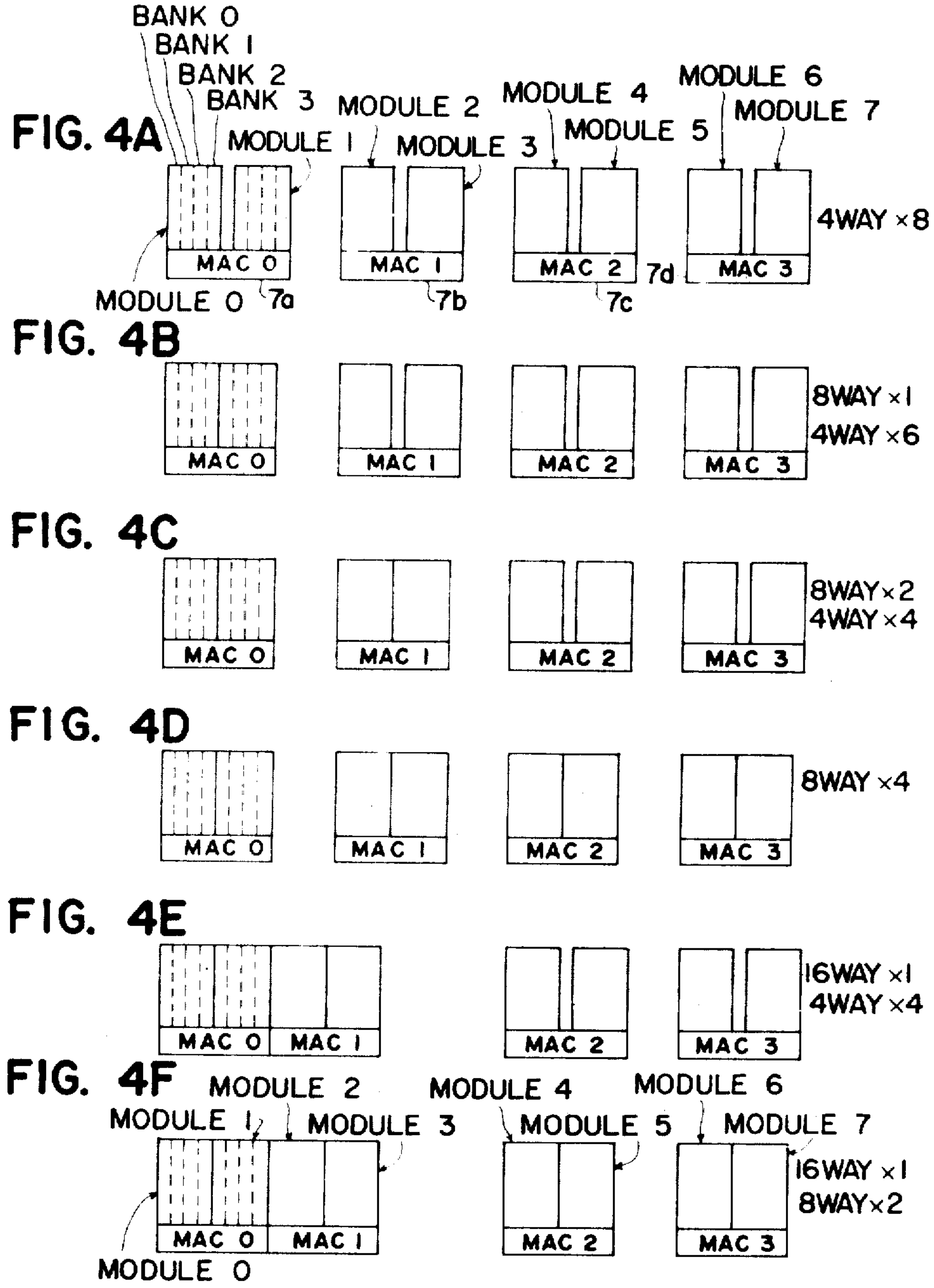
FIGS. 4A to 4H show one example of the memory arrangement in the case where the memory depicted in FIG. 1 is operated with various interleave numbers.

FIGS. 4A shows the mode of operation of the memory in which the 4-way interleave is adopted for each of the modules 0 to 7, FIG. 4B shows the mode of operation in which the 8-way interleave is used for the modules 0 and 1 and the 4-way interleave for the remaining modules and FIG. 4C shows the mode of operation in which the 8-way interleave is used for the modules 0 and, 1 and 3, and the 4-way interleave for the others. Similarly, FIG. 4H shows the mode of operation in which the 32-way interleave is adopted for all the modules 0 to 7.

Figures 4G, 4H, 4J, 4K, 4L, 4M, 4N, 4P, 4Q:
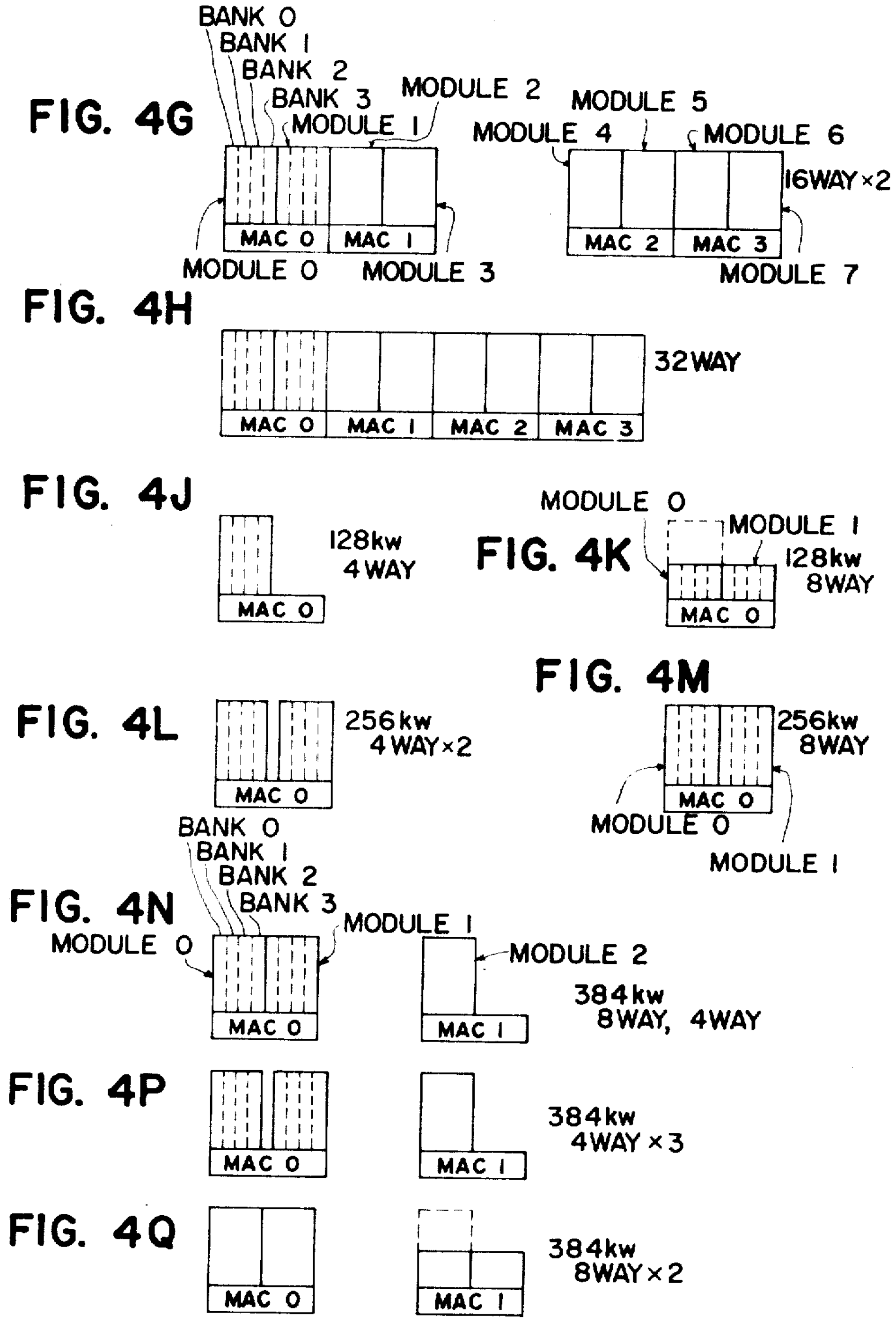
FIGS. 4J to 4X illustrate one example of the memory arrangement when the memory shown in FIG. 1 is out of order or in the course of increasing memories.
Figures 4R, 4S, 4T, 4U, 4V, 4W, 4X:
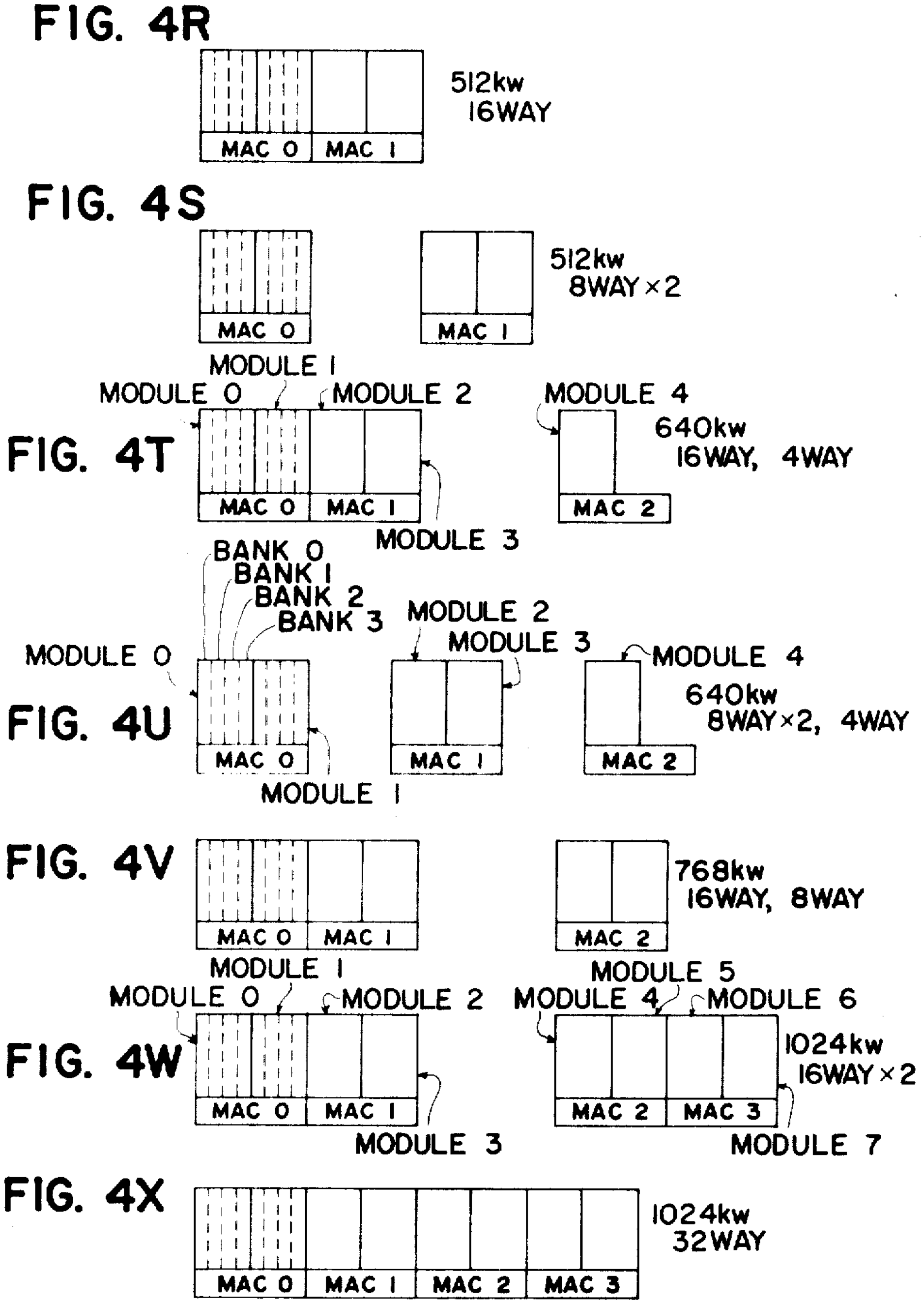

FIGS. 4J to 4X are diagrams, for explaining the memory arrangements in the case where the memory 1 having eight modules, shown in FIG. 1, is constructed with less modules in accordance with the scale of the data processing system used.

In FIG. 4J, a single module, that is, the module 0 consisting of four banks each having a capacity of 32 Kwords is operated with the 4-way interleave; in FIG. 4K, the module having a capacity of 128K words, depicted in FIG. 4J, is divided into two modules and operated with the 8-way interleave; and in FIG. 4L, the modules 0 and 1 are individually operated with the 4-way interleave. Likewise, in FIG. 4X, the modules 0 to 7 are operated with the 32-way interleave.

The capacity of the memory 1 is determined in accordance with the scale of the data processing system and the unit for increasing the capacity is one module in the case of such a system as shown in FIG. 1. Therefore, the overall memory capacity increases with the number of modules and in respective modes of operation the interleave number is selectively altered and various forms such, for example, as shown in FIGS. 4J to 4X exist.

Here, attention should be paid to the mode of operation such as depicted in FIGS. 4K and 4Q in which one module is divided into two modules and the interleave number is selected large to enable parallel access thereto. Such mode of operation is required according to the system employed and it is necessary to design the memory to readily cope with such alteration. This will be described in detail later on.

The memory 1 should be changed as desired in accordance with the scale of the system used as illustrated in FIGS. 4A to 4X. In the present invention, the memory is adapted so that such alteration may be effected by exchanging a predetermined bit or bits of address information.

Reference should be made to FIGS. 5A to 5D, 6A to 6E and 7A to 7E for explaining the exchange of bits.

FIGS. 5A to 5D show how each address changes with alterations of the interleave number. In the case of the 4-way interleave depicted in FIG. 5A, an address, for example "01" indicates an address in the first line (the initiating line referred to as the 0th line) counting from a 64K address in the module 0 containing 128K words, that is, 128K addresses. Namely, let it be assumed that 0 in the address 01 represents the number of the module and the 1 represents the address 01 being in the first line. Assume that an address 44 similarly represents one of addresses of a fourth line counting from the 64K address in the module 4. Though not shown in the Figure, in the case of the 4-way interleave, 01 is present in the bank 1 among the four banks (that is, 0 to 4) and 44 in the bank 2.

Figures 5A, 5B:
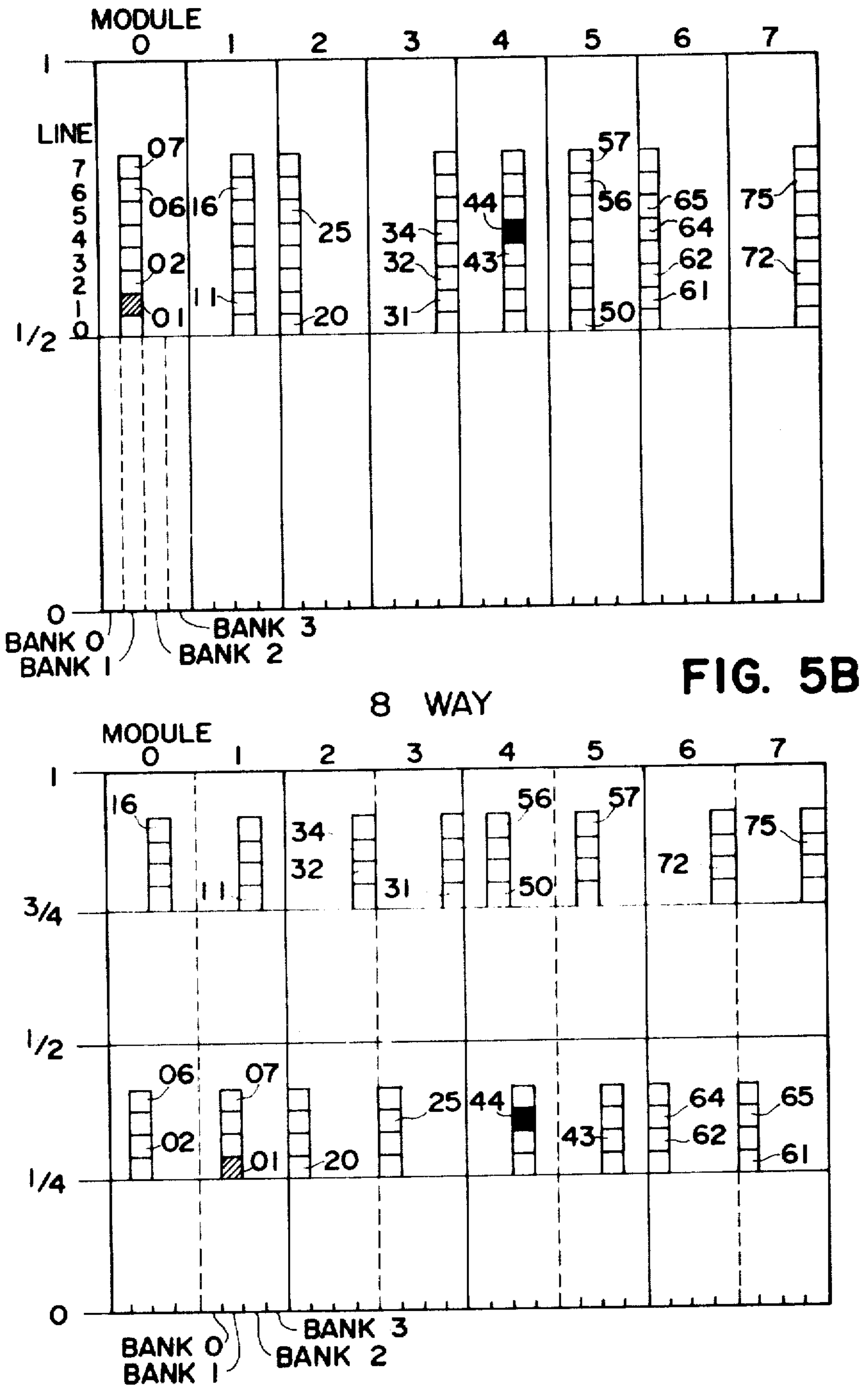
FIGS. 5A to 5D show one example of changes of an address in the case of 4-, 8-, 16- and 32-way interleaves.
Figure 5C:
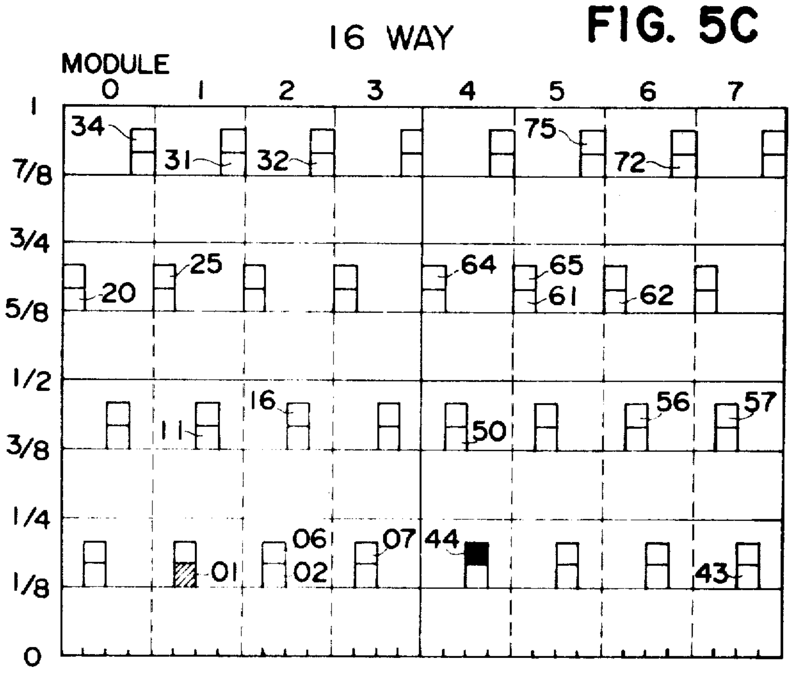
Figure 5D:
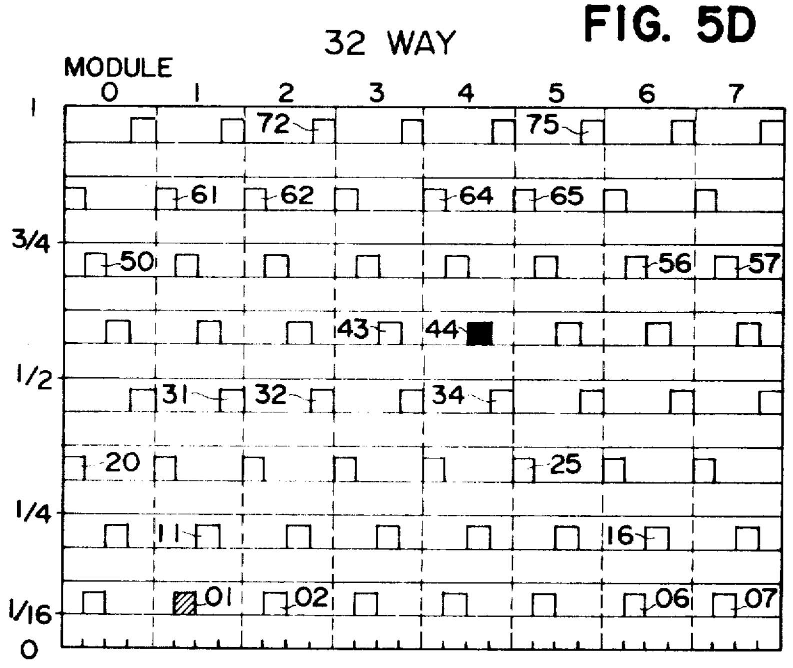

To which positions in the 8-, 16- and 32-way interleaves an address, for example, 44 at a specified position in FIG. 5A showing the 4-way interleave is transferred, can be known by referring to the same address in FIGS. 5B, 5C and 5D.

An examination of FIGS. 5A, 5B, 5C and 5D shows the following rules in the transference of addresses in the case of changing over the interleave:

Rule 1. In the case of changing over the 4-way interleave of FIG. 5A to the 8-way one of FIG. 5B, addresses positioned in $2rth$ lines ($r$ being a desired integer), that is, addresses 02, 06, 16, 20, 32, 34, 44, 50, 56, 62, 64, 72 and so on in FIG. 5A, are located in even-number modules, that is, the modules 0, 2, 4 and 6 in FIG. 5B, while addresses positioned in $(2r+1)$st lines in FIG. 5A, that is, 01, 07, 11, 25, 31, 43, 57, 61, 65, 75 and so on, are placed in odd-number modules, that is, the modules 1, 3, 5 and 7.

Rule 2. In the case of changing over the 4-way interleave of FIG. 5A to the 16-way one of FIG. 5C, addresses lying in $4rth$ lines in FIGS. 5A, that is, 20, 34, 44, 50, 60 and so on are positioned in the modules 0 and 4 in FIG. 5C: addresses in $(4r+1)$st lines, that is, 01, 11, 25, 31, 61, 65, 75 and so on, are placed in the modules 1 and 5; addresses lying in $(4r+2)$nd lines in FIGS. 5A, that is, 02, 6, 16, 32, 56, 62, 72 and so on are positioned in the modules 2 and 6; and addresses present in $(4r+3)$rd lines, that is, 07, 43, 57 and so on are located in the modules 3 and 7.

Rule 3. In the case of changing over the 4-way interleave of FIG. 5A to the 32-way one of FIG. 5D, addresses appearing in $8rth$ lines in FIG. 5A, that is, 20, 50 and so on, are positioned in the module 0; addresses in $(8r+1)$st lines, that is, 01, 11, 31, 61 and so on are located in the module 1; and, in a similar manner, addresses in $(8r+7)$th lines, that is, 07, 57 are placed in the module 7.

Figure 6A:
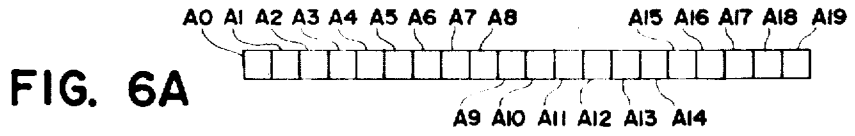
FIGS. 6A to 6E show one example in which the changes depicted in FIGS. 5A to 5D are achieved by bit operation.

In FIGS. 6A to 6E, there is illustrated means for changeover of the interleave based on the above-mentioned rules in connection with the address 44. Assuming that all the modules 0 to 7 are operated with the 4-way interleave, an address representing the pure binary digit of the address 44 at the position shown in FIG. 5A is given by 10010000000000010010. FIG. 6A generally shows the address information from the data processing unit in the form of bits $A_0$ to $A_{19}$ and in the case of the above address 44, the bits $A_0$, $A_3$, $A_{15}$ and $A_{18}$ may be considered to be 1.

Figure 6B:
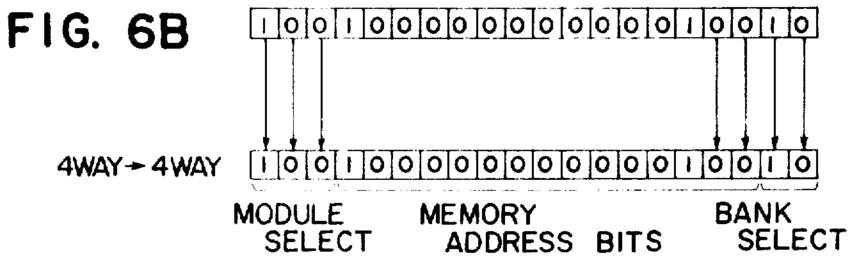

In the case of the 4-way interleave depicted in FIG. 6B, the most significant three bits 100 represents 4, that is, 100 which in the address of the module 4 and the other bits represent an address in the module 4.

Figure 6C:
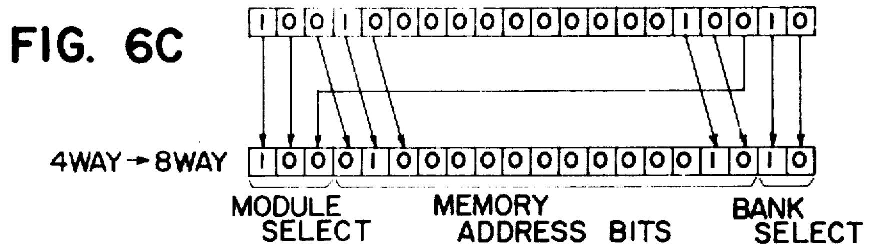

In the case of the 8-way interleave, when the most significant three bits are formed with the most significant two bits and a bit third from the least significant bit by the application of the aforesaid Rule 1, 100 thereby indicated represents the address of the module in the case of the 8-way interleave and the remaining bits an address in the module 4. As will be seen from FIGS. 5A and 5B, in such a case, the addresses in the module 4 are placed at positions that the positions in the case of the 4-way interleave are multiplied by one-half. In the present example, however, the digits of $2^0$ and $2^1$ are placed without being multiplied by one-half because each module is divided into four banks. The multiplication by one-half corresponds to rightward shift by one bit as shown in FIG. 6C.

Figure 6D:
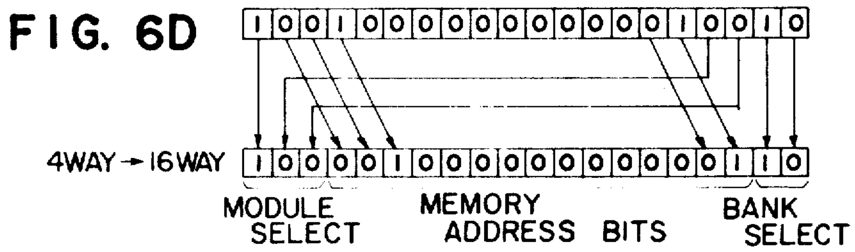

In the case of the 16-way interleave depicted in FIG. 6D, by forming the most significant three bits from the most significant bit and bits fourth and third from the least significant digit by the application of the aformentioned Rule 2, 100 thereby indicated represents the address of a module in the case of the 16-way interleave and the remaining bits are multiplied by one-fourth (shifted rightwards by two bits) except $2^0$ and $2^1$ and it represents the address of 44 in that module.

Figure 6E:
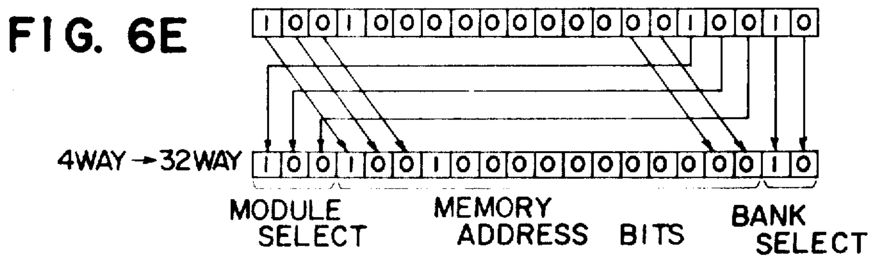

In the case of the 32-way interleave shown in FIG. 6E, by forming the most significant three bits with bits fifth, fourth and third from the least significant digit, 100 thereby indicated represents the address of the module in the case of the 32-way interleave and the remaining bits are multiplied by one-eighth except $2^0$ and $2^1$ to represent the address in the module.

Further, in the present example $2^0$ and $2^1$ express the address of the bank in which 44 exists but, as will be seen from FIGS. 5A to 5D, the address of the bank does not change for any specified addresses even in the case of changing over the interleave number. (Of course, the address of the module changes upon changing over the interleave number but the addresses of the banks in that module do not change.) Accordingly, it is also possible to determine the bank by utilzing the two bits.

The reason for the multiplications by one-half, one-fourth and one-eighth in the foregoing, is that in FIGS. 5A to 5D, for example, in the case of the 4-way interleave (FIG. 5A), the address 44 has an address corresponding to about one-half of that in the module 4, that is, an address (64K+18), which is regarded as (64K+16) except the digits $2^0$ and $2^1$; while in the case of the 8-way interleave (FIG. 3B), the address in the module 4 is regarded as an address (32K+8) which is equal to that multiplied by one-half. Similarly, in the cases of the 16- and 32-way interleaves (FIGS. 3C and 3D), the addresses in the module 4 are those multipled by one-fourth and one-eighth of those in the case of the 4-way interleave except the digits $2^0$ and $2^1$.

FIGS. 6B, 6C, 6D and 6E show the cases of only the address 44 but by effecting similar operations for all the other specified addresses it is possible to determine the module addresses of the specified addresses and addresses therein at the time of changing over the interleave number and by using the bits of $2^0$ and $2^1$ bank addresses can also be determined.

The foregoing has exemplified the correspondence of addresses at the time of changing over the interleave number with reference to FIGS. 5A to 5D and 6B to 6E. In changing over the interleave, it is sufficient only to determine by the bit operation in which module one specified address is positioned and further in which bank it is placed. Accordingly, it is sufficient only to determine that the specified address, for example, the address 44 in the case of the 4-way interleave shown in FIG. 5A is positioned in the module 4 (bank 2) in the case of the 8-way interleave depicted in FIG. 5B and its position in the module 4 (bank 2) is as desired. Therefore, in the example of FIGS. 6C to 6E, the operations for multiplication by one-half, one-fourth and one-eighth are achieved for address determination but the operations are only illustrative and such operations are not alway required, and it is possible to select the memory address bits in the memory so as to simplify the hard ware arrangement for the bit operation.

FIGS. 7A to 7F are diagrams for explaining a bit exchanging method designed for simplification of the hard ware arrangement at the time of the bit exchanging operation.

Figure 7A:
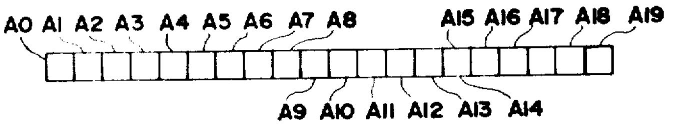
FIGS. 7A to 7E are modifications of the changing operations in FIGS. 6A to 6E, illustrating one example of the bit operation according to this invention to permit simplification of the hard ware arrangement in the bit operation.
Figure 7B:
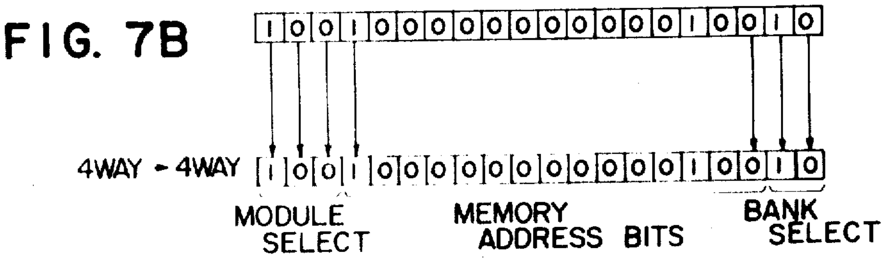
Figure 7C:
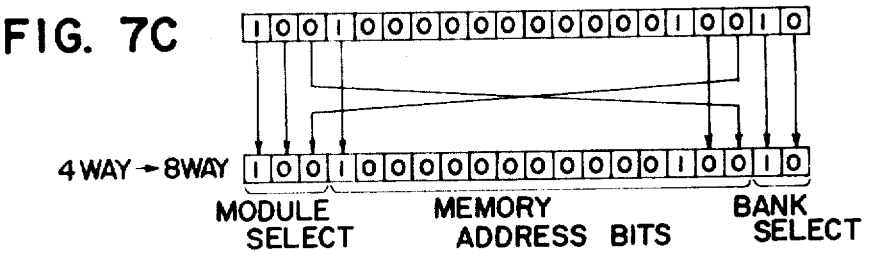
Figure 7D:
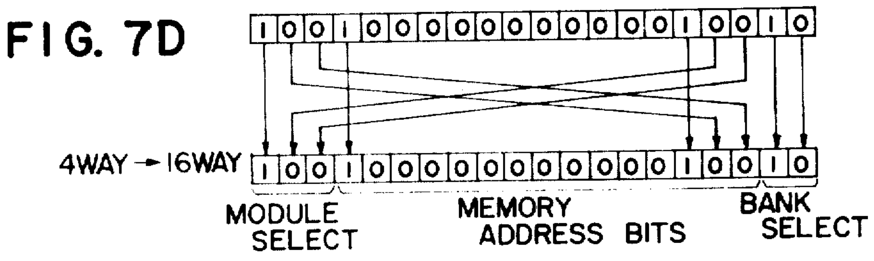
Figure 7E:
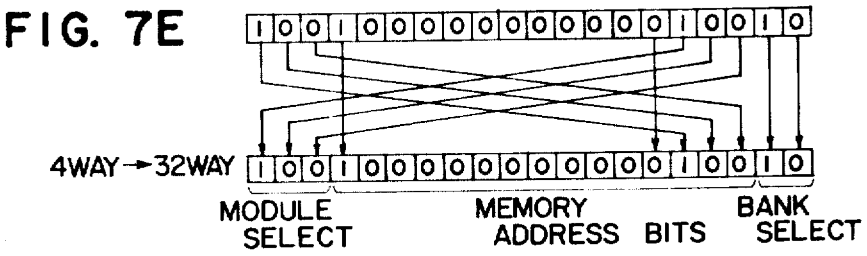

FIG. 7A shows bits $A_0$ to $A_{19}$ corresponding to those in FIG. 6A. In FIGS. 7B to 7E, the MODULE selects and BANK selects are the same as those in FIGS. 6B to 6E respectively. As to the memory address bits, only the least significant three bits, that is, $A_{15}$, $A_{16}$ and $A_{17}$, are changed without rightward shift as shown in FIGS. 6B to 6E. Therefore, in the cases of FIGS. 7B to 7C, no change is caused in the bits $A_3$ to $A_{14}$ in the address information (FIG. 7A) given by the data processing unit, so that the hard ware arrangement becomes simplified.

However, determination of the memory address bits depicted in FIGS. 7B to 7E is not limited specifically thereto and may be modified, of course.

Figure 8A:
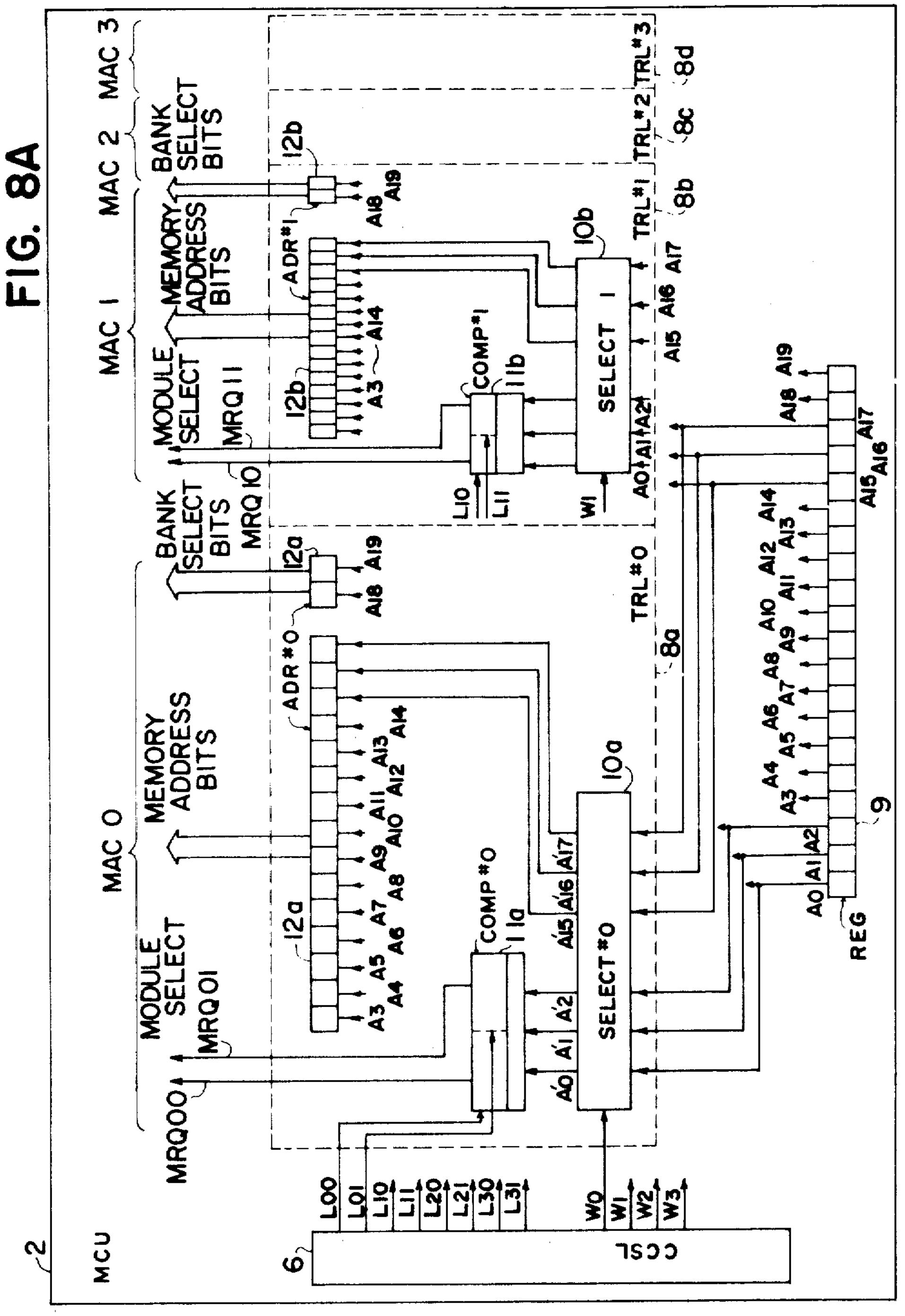
FIG. 8A is a schematic diagram showing one example of this invention for changing over the interleave in the system depicted in FIG. 1.
Figure 8B:
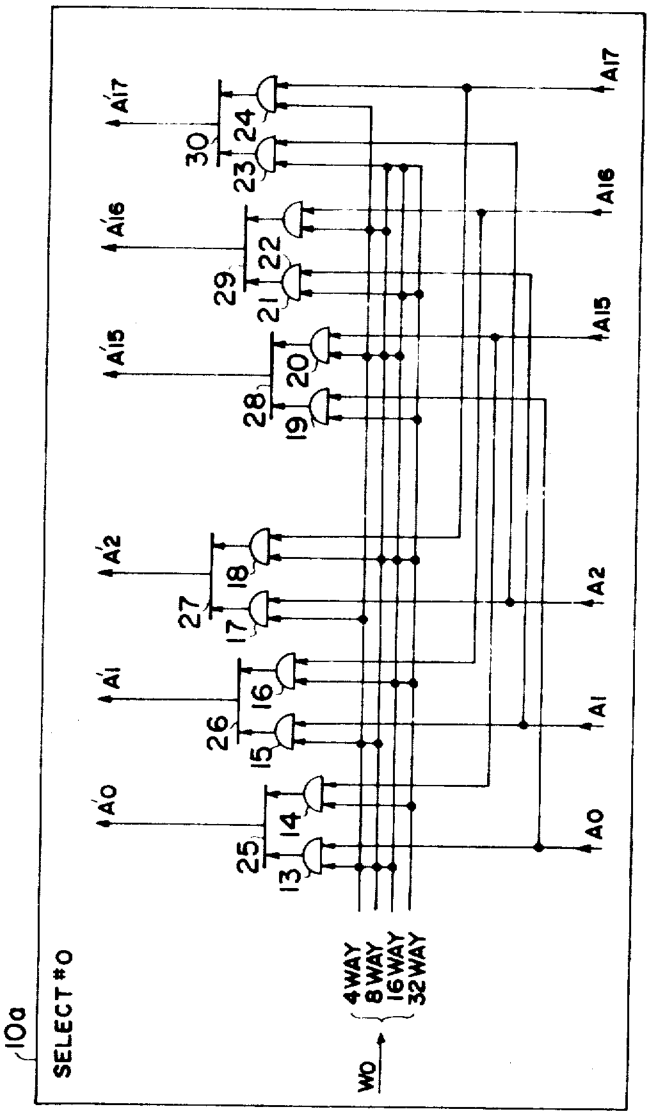
FIG. 8B is a circuit diagram showing one example of a memory access control unit selector (SELECT No. 0) used in the example of FIG. 8A.
Figure 8C:
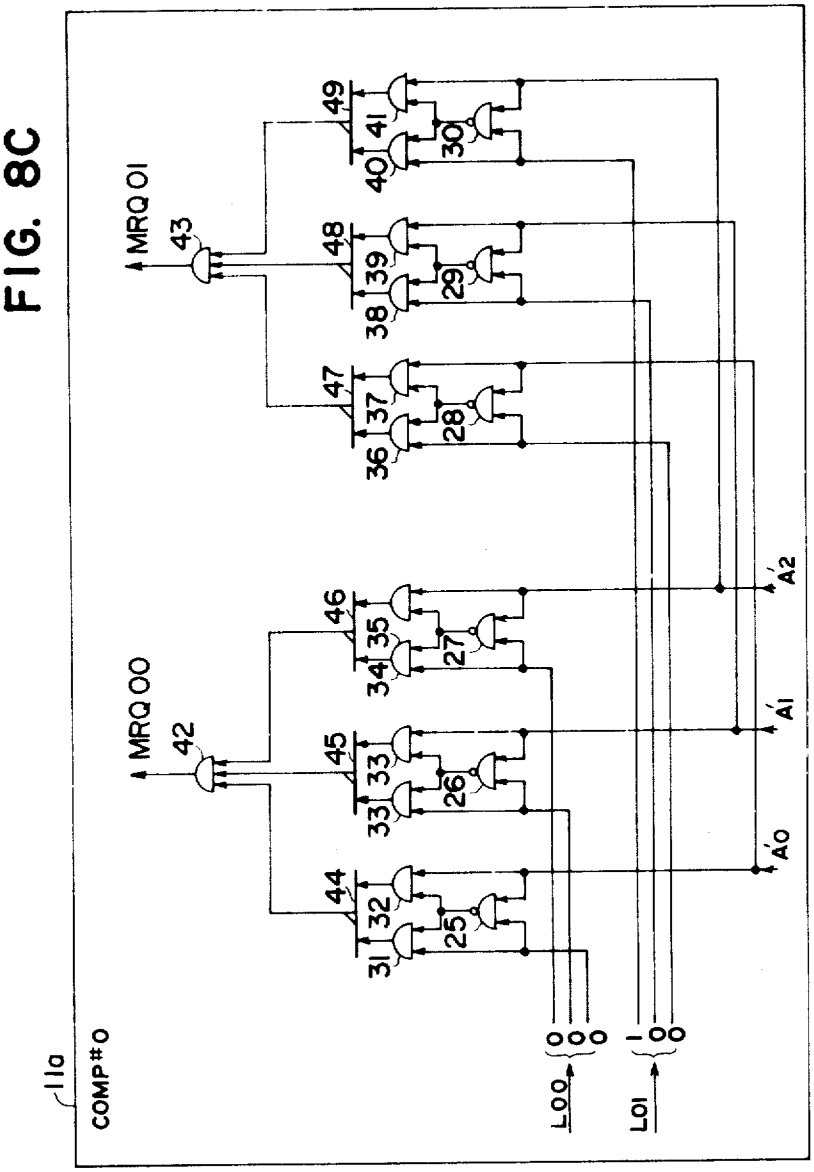
FIG. 8C is a circuit diagram illustrating one example of a module select comparator (COMP No. 0) employed in the example of FIG. 8A.

FIGS. 8A, 8B and 8C illustrate one example of this invention in which the bit exchange operations of FIGS. 7B to 7E are achieved with a given interleave number to select a correct module (and a correct bank) in accordance with a given module arrangement of the memory.

In FIG. 8A, reference numeral 2 indicates the memory control unit (MCU), 6 the memory system changeover unit (CCSL), 8*a* to to 8*d* translators (TRL No. 0 to TRL No. 3) which feed address information having bits exchanged to access control units 7(MAC) corresponding thereto respectively, 9 an address register in which address information (given by the bits $A_0$ to $A_{19}$) derived from the data processing information, 10*a* to 10*b* memory access control unit selectors (SELECT No. 0 and No. 1) shown in detail in FIG. 8B, 11*a* and 11*b* module select comparators (COMP No. 0 and No. 1) shown in detail in FIGS. 8C, 12*a* and 12*b* registers in which address information converted as a result of the bit exchange operation is set, $A_0$ to $A_{19}$ bit information, $A_0'$, $A_1'$, $A_2'$ and $A_{15}'$, $A_{16}'$, $A_{17}'$ converted bit information, $W_0$ to $W_b$ $W_3$ signals for supplying the translators 8a to 8d with information of a designated interleave number (one of the 4-, 8-, 16- and 32-way interleaves) respectively, $L_{00}$ to $L_{31}$ module address information fed to the respective modules 0 to 7, $MRQ_{00}$ to $MRQ_{01}$ a module 0 access demand signal and a module 1 access demand signal for selecting either one of the modules 0 and 1, and $MRQ_{10}$ and $MRQ_{11}$ similarly a module 2 access demand signal and a module 3 access demand signal. The module address information $L_{00}$ to $L_{31}$ is given corresponding to the module arrangement at the time shown in FIGS. 4A to 4X respectively. Namely, in the case of the arrangement such, for example, as depicted in FIG. 4U, the information $L_{00}$ corresponds to the module 0, the information $L_{01}$ corresponds to the module 1, and similarly the information $L_{20}$ corresponds to the module 4; in the arrangement shown in FIG. 4U, no modules corresponding to the information $L_{21}$ to $L_{31}$ exist.

In FIG. 8A, the address information from the data processing unit, for example, the central processing unit (CPU) is set in the form of bits $A_0$ to $A_{19}$ in the address register 9. The bit exchange of this address information is achieved as by the memory access control unit selectors 10a and 10b. Namely, the selectors 10a and 10b exchange the bits $A_0$, $A_1$, $A_2$ and $A_{15}$, $A_{16}$, $A_{17}$ as shown in FIGS. 7B to 7E in response to the interleave number information from the memory system changeover unit 6.

The most significant three bits $A_0'$, $A_1'$, and $A_2'$ obtained as a result of the bit exchange operation are compared with the module address information $L_{00}$, $L_{01}$, $L_{10}$ and $L_{11}$ from the memory system changeover unit 6 in the module select comparators 11a and 11b. Namely, assuming that, for example, 000 is given as the bits $A_0'$, $A_1'$, $A_2'$ as a result of the bit exchange operation, the output 000 agrees with the module address information from the memory changeover unit 6 in the comparator 11a, so that the comparator 11a produces the module 0 access demand signal $MRQ_{00}$ for the module 1. Further, where the bits $A_0'$, $A_1'$, $A_2'$ are 001, the demand signal $MRQ_{01}$ is produced.

While, outputs from the memory access control unit selectors 10a and 10b and the address register 9 set the bit-exchanged address information in the registers 12a and 12b, thereby designating a specified address in the specified module. At the same time, the bits $A_{18}$ and $A_{19}$ also indicate a specified bank address.

In short, the bits of the address information $A_0$ to $A_{19}$ set in the address register 9 are exchanged as by the selectors 10a and 10b in accordance with a given interleave number information, and the bits $A_0'$, $A_1'$, $A_2'$ obtained as a result of the above operation are compared with the module address information $L_{00}$ to $L_{31}$ to determine one module corresponding to the module arrangement in the system used at that time. Then, access to a predetermined address in the specified module is made in accordance with the bit information set in the registers 12a, 12b and so on. Namely, access to the predetermined address is made in accordance with the interleave number information and the module address information designated by the memory changeover unit 6.

FIG. 8B illustrates in detail the memory access control unit selector (SELECT No. 0) 10a shown in FIG. 8A. In the figure, reference numerals 13 to 24 AND gate circuits and 25 to 30 OR gate circuits. Reference characters $A_0$, $A_1$, $A_2$, $A_{15}$, $A_{16}$, $A_{17}$, $A_0'$, $A_1'$, $A_2'$, $A_{15}'$, $A_{16}'$, $A_{17}'$ and WO correspond to those in FIG. 8A respectively. 4-way, 8-way, 16-way and 32-way indicate information representing one of the interleave numbers given by the aforesaid memory system changeover unit 6.

As will be apparent from FIG. 8B, processes for converting the bits $A_0$, $A_1$ and $A_2$ into $A_0'$, $A_1'$ and $A_2'$, and those $A_{15}$, $A_{16}$ and $A_{17}$ into $A_{15}'$, $A_{16}'$ and $A_{17}'$ correspond to those bit exchange operations shown in FIGS. 7B to 7E. Namely, it will be seen that where information of, for example, 8-way interleave, the AND gate circuits 13, 15, 18, 20, 22 and 23 are turned on to change $A_0$ to $A_0'$, $A_1$ to $A_1'$, $A_2$ to $A_{17}'$, $A_{15}$ to $A_{15}'$, $A_{16}$ to $A_{16}'$, and $A_{17}$ to $A_2'$ respectively.

FIG. 8C shows the detailed construction of the module select comparator (COMP No. 0) 11a depicted in FIG. 8A. In the figure, reference numerals 25 to 30 identify NAND gate circuits, 31 to 43 AND gate circuits and 44 to 49 NOR gate circuits. $A_0'$, $A_1'$, $A_2'$, $L_{00}$, $L_{01}$, $MRQ_{00}$ and $MRQ_{01}$ correspond to those in FIG. 8A respectively.

For example, the NAND gate circuit 25, the AND gate circuits 31 and 32, and the NOR gate circuit 44 perform a "not" logic operation of exclusive "or" as a whole and provide an output 1 when the bit $A_0'$ is 0. Accordingly, it will be understood that where the bits $A_0'$, $A_1'$ and $A_2'$ are 000, it agrees with the information $L_{00}$ to turn on the AND gate circuit 42.

With reference to FIGS. 1 to FIGS. 8A, 8B and 8D, the foregoing has described that a predetermined module (and a bank therein) can be correctly selected by the bit exchange operation for the address information from the data processing unit irrespective of changes in the memory arrangement of the data processing system and in the interleave number.

Referring now to FIGS. 9 to 14, a description will be given in connection with the bit exchange operation for facilitating simultaneous, parallel access when one module is divided into two as shown in FIGS. 4K and 4Q.

Figure 9:
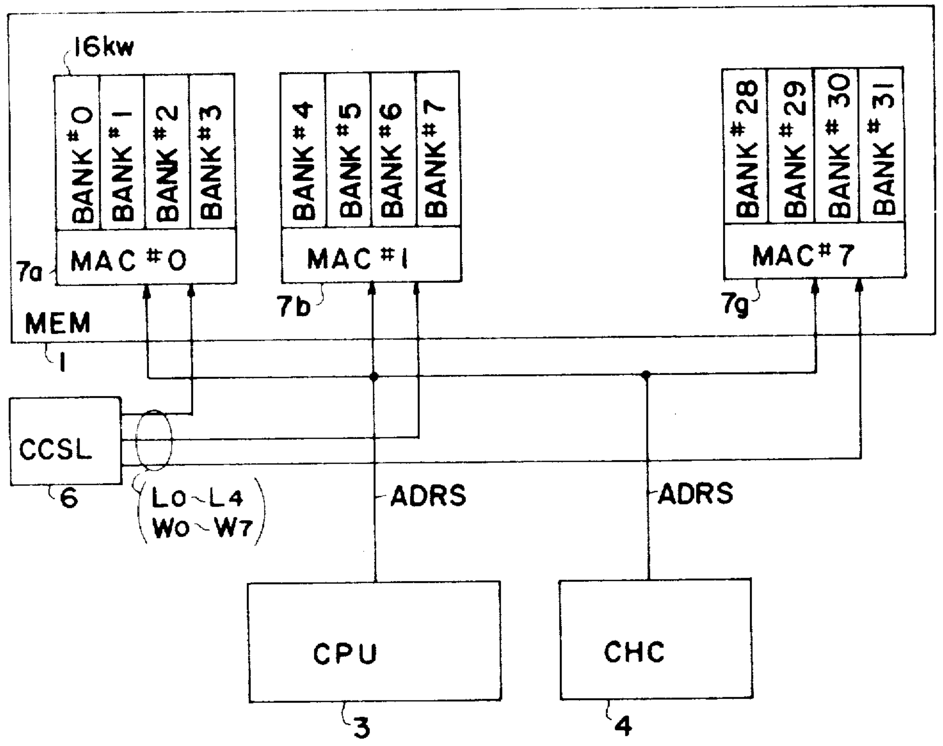
FIG. 9 is a block diagram, similar to FIG. 1, showing another example of the data processing system to which this invention is applied.

The bit exchange operation for address information corresponding to changes in the memory arrangement and in the interleave number according to this invention is not always limited specifically to the memory arrangement shown in FIG. 1, but may similarly be applied to such an arrangement as depicted in FIG. 9.

The main difference in construction between the memories of FIGS. 1 and 9 is that in FIG. 1 two modules are placed under the control of one memory access control unit (MAC), while in FIG. 9 four banks are held under the control of one memory access control unit. Namely, in FIG. 9, one memory access control unit (MAC) is provided corresponding to each module shown in FIG. 1.

Such a memory arrangement is often used in small-scale data processing systems as compared with that of FIG. 1. The following description will be given on the assumption that designation of the interleave number includes 1-, 2-, 4- and 8-way interleaves, but the arrangement can easily be changed for effecting the 16- and 32-way interleaves, if necessary.

In FIG. 9, reference numerals 1, 3, 4, 6, 7a to 7g correspond to those in FIG. 1. Reference character ADRS represents address information given by the data processing unit, which information is that prior to the bit exchange operation according to this invention; $L_0$ to $L_4$ refer to bank address information in the form of a binary number of five bits which is capable of designating 32 banks No. 0 to No. 31 in all and $W_0$ to $W_7$ indentify interleave number information indicating the interleave number (one of 1-way, 2-way, 4-way and 8-way) for the memory access control units (MAC) *7a* to *7g* corresponding thereto respectively.

Such a selection of the module as effected by the memroy control unit (MCU) 2 in FIG. 1 corresponds to bank selection in FIG. 9 which is achieved in the memory access control units *7a* to *7g*.

In FIG. 9, the memory 1 is divided into a pluraltiy of banks BANK No. 0 to BANK No. 31 (each having a capacity of, for example, 16K words), and four banks are controlled by one memory access control unit 7(MAC). In the case of writing and reading information stored in the memory, a memory address code signal ADRS, a memory access demand signal and data (not shown) are transmitted all together from a data processing unit such as the central processing unit CPU to each of the memory access control units MAC *7a* to *7g*, in each of which these signals fed thereto are examined as to whether they are to be fed to the memory banks held under the control of the memory access control unit itself and a memory bank being specified is controlled. In this case, the bank addresses of the memory banks are made variable and the address of each bank is determined according to the bank address information $L_0$ to $L_4$ applied from the system changeover unit (CCSL) 6 to the memory access control units (MAC), thereby to cope with such alterations of the arrangement as shown in FIGS. 4A to 4X. Accordingly, based upon the memory address information $A_0$ to $A_{18}$ supplied from the central processing unit CPU and the bank address information $L_0$ to $L_4$, each of the memory access control units *7a* to *7g* determines whether the memory access demand fed from the central processing unit CPU is for the memory banks BANK held under the control of that memory access control unit.

Further, upon designation of the interleave number, each of the memory access control units *7a* to *7g* judges whether the memory access demand is for that unit by utilizing the interleave number information ($W_0$ to $W_7$) from the system changeover unit (CCSL) 6 in addition to the above-mentioned two signals.

Also in this case, the memory 1 is adapted to cope with changes in arrangement resulting from changeover of the interleave number, combinations of banks according to different interleave numbers and an increase or decrease in the number of the banks such as shown in FIGS. 4A to 4X in relation to FIG. 1, and further, the memory is designed for use in the case of one bank being divided into two as depicted in FIGS. 4K and 4Q in which one module is divided into two.

Figure 10:
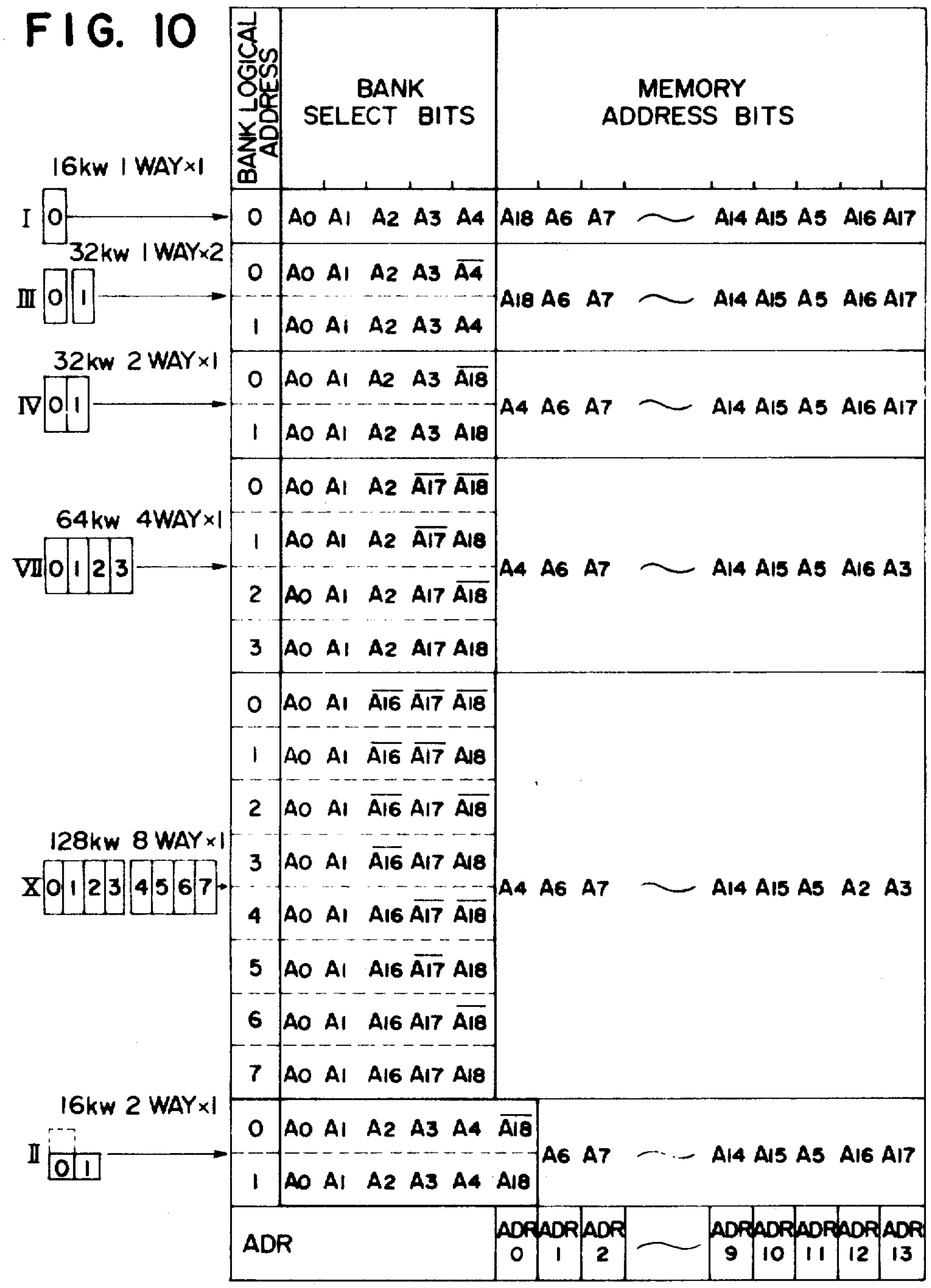
FIG. 10 is one example of the bit operation used for changing over the interleave in the memory arrangement depicted in FIG. 9.

FIG. 10 is a table showing the outline of bank selection accompanying changes in response to the interleave number. The bits of the address information ADRS derived from the data processing unit are exchanged in accordance with this table, and then access to a specified bank is made.

The bit exchange of the address information shown in FIG. 10 corresponds to those of FIGS. 7A to 7E shown in relation to FIG. 1. In the case of the 16K words and 1-way interleave indecated by the type (I) in FIG. 10, the most significant five bits $A_0$ to $A_4$ of the address code signal ADRS from the central processing unit CPU or the like are used as bank select bits for bank selection and the remaining 14 bits $A_5$ to $A_{18}$ are used as bits representing the address in the selected bank. The arrangement of the bits used as the memory address bits is different in the arrangement of the bits $A_{18}$ and $A_5$ from that of the bits $A_5$ to $A_{18}$ transmitted as memory address information from the central processing unit CPU or the like as shown in the table, but this is for simplification of the hard ware arrangement which is necessary for the bit exchange as will be described later on; this corresponds to the description given previously in connection with the change in the bit exchange from FIG. 6 to FIG. 7.

Also in the case of the type (III) in which two banks each of the capacity 16K words are employed (32K words and 1-way × 2), the bits $A_0$ to $A_4$ are used as the bank select bits and those $A_5$ to $A_{18}$ are used as the memory address bits as in the case of the type (1), and discrimination of the banks No. 0 and No. 1 is achieved according to whether the bit $A_4$ is 1 or 0, that is, $A_4$ or $\overline{A_4}$.

In the case of the type (IV) in which two banks each of the capacity 164K words are employed and the interleave is 2-way (32K words and 2-way × 1), five bits $A_0$ to $A_3$ and $A_{18}$ are used as the bank select bits and the remaining 13 bits $A_4$ to $A_{17}$ as the memory address bits. In the case of the type (IV), the bits $A_4$ and $A_{18}$ are exchanged unlike in the cases of the types (I) and (III).

In the case of the type (VII) in which four banks each of the capacity 16K words are employed and the interleave is 4-way (64K words and 4-way × 1), five bits $A_0$ to $A_2$, $A_{17}$ and $A_{18}$ and the remaining bits $A_3$ to $A_{16}$ are used as the bank select bits and the memory address bits respectively.

Comparing the bit arrangements in the cases of the types (VII) and (I), the bits $A_3$ and $A_{17}$ are exchanged and those $A_4$ and $A_{18}$ are also exchanged.

In the case of the type (X) in which eight banks each of the capacity of 16K words are employed and the interleave is 8-way (128K words and 8-way × 1), five bits $A_0$, $A_1$ and $A_{16}$ to $A_{18}$ and the remaining ones $A_2$ to $A_{15}$ are used as the bank select bits and the memory address bits respectively.

The difference in the bit arrangement between the types (X) and (I) is that the bits $A_2$ and $A_{16}$, $A_3$ and $A_{17}$, and $A_4$ and $A_{18}$ are exchanged respectively.

In the event that the bank capacity is changed to 8K words and two banks of the capacity 8K words are employed and the interleave is 2-way as indicated by the type (II) (16K words and 2-way × 1), six bits $A_0$ to $A_4$ and $A_{18}$ and the remaining 13 bits $A_5$ to $A_{17}$ are used as the bank select bits and the memory address bits respectively. The cases of the types (II) and (I) are different from each other in the number of the bank select bits, i.e. six bits in the former and five bits in the latter, and accordingly also in the number of the memory address bits, i.e. 13 bits and 14 bits.

This is due to the employment of such a bank selection method that since two banks of 8K words are formed by dividing the bank of 16K words (for example, BANK No. 0) in practice, the bank of 16K words is first selected by the five bits $A_0$ to $A_4$ as is the case with the type (I) and then the upper or lower 8K words of the selected bank is selected. With the use of this method, bank selection can be achieved at will, even if the memory unit, that is, the bank capacity is altered. In this case, the memory address bits decreases from 14 bits to 13 bits but this does not matter because the bank capacity is reduced by half from 16K words to 8K words.

The bit exchange operations shown in FIG. 10 are similar in many points to but a little different from those described previously in connection with FIGS. 7A to 7E in relation to FIG. 1. Namely, the bank selection by those bits $A_0$ to $A_4$ and $A_{16}$ to $A_{18}$ of the address information $A_0$ to $A_{18}$ from the data processing unit which are exchanged according to predetermined rules in FIG. 10, corresponds to the module selection by the bits $A_0$ to $A_2$ and $A_{15}$ to $A_{17}$ in FIGS. 7A to 7E.

For the selection, in FIG. 10, the three bits including the least significant bit, that is $A_{16}$, $A_{17}$ and $A_{18}$, are used, while in FIGS. 7A to 7E the three bits $A_{15}$, $A_{16}$ and $A_{17}$, more significant than those $A_{18}$ and $A_{19}$, are used. This is because a minimum interleave number of the memory shown in FIG. 9 is 1-way and because that of the memory in FIG. 1 is 4-way. No essential difference exists between the both of them.

In FIG. 10, the positions of the bits $A_{18}$ and $A_5$ of the memory address bits are shifted. This is to simplify the hardware arrangement accompanying bit exchange as described previously and no essential difference exists between the bit arrangements in FIG. 10 and those in FIGS. 7A to 7E. It may be considered that positioning of the bit $A_{18}$ at the most significant bit of the memory address bit is to make one bank of the capacity 16K words divisional into two and hence facilitate such division of the bank as in the case of the type (II).

Figure 11:
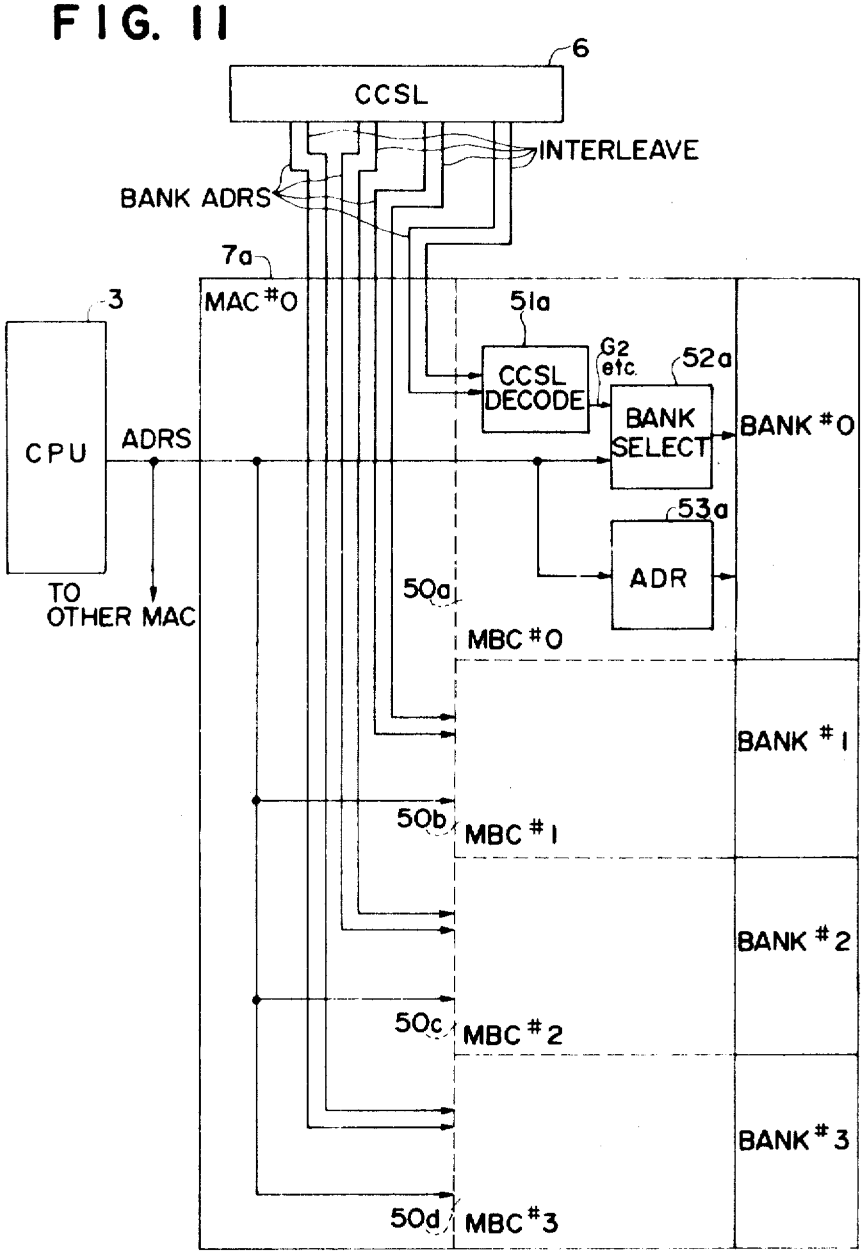
FIG. 11 is a schematic diagram showing the general construction of a memory access control unit (MAC No. 0) shown in FIG. 9.

FIG. 11 is a circuit diagram, corresponding to FIG. 9, showing the general construction for making correct access to a predetermined bank in response to the bit exchange operation shown in FIG. 10 and an increase or decrease in the number of banks. In the figure, reference numerals 3, 6 and *7a* correspond to those in FIGS. 9, and 50*a* to 50*d* indicate memory bank control units MBC No. 0 to No. 3 for directly controlling banks No. 0 to No. 3 respectively corresponding thereto, 51*a* refers to a system changeover decoder supplied with interleave number information and bank address information (BANK ADRS) from the memory system changeover unit 6 to provide gate signals $G_2$ and so on as described later on, 52*a* identifies a bank selector circuit which produces an output 1 when the bank of itself is designated, and 53*a* refers to an address register in which processed memory address bits are set.

In the circuit shown in FIG. 11, the system changeover unit CCSL 6 produces an interleave signal (INTERLEAVE) and a bank address signal (BANK ADRS) for each bank in accordance with the arrangement of the system used and the system changeover decoder CCSL DECODE 51*a* supplies the bank selector circuit BANK SELECT 52*a* with the signals $G_2$ and so on necessary for bank selection. Under such conditions, when supplied with a memory access demand signal (not shown) and address information signal ADRS (shown in the form of bits $A_0$ to $A_{18}$ in FIG. 10) from the data processing unit 3, the bank selector circuit BANK SELECT 52*a* judges whether the demand is for its bank or not.

In this case, it is also possible to arrange the circuit so that each time the access demand signal is generated by the data processing unit 3 to provide the address information, a logical arithmetic operation following the table of FIG. 10 is achieved for each bit of the address information. HOwever, the arithmetic operation requires the passage through a predetermined number of gate circuits, and consequently the access time becomes longer correspondingly.

Since the interleave changeover and the change in the bank capacity can be predetermined according to the system arrangement used, the signals $G_2$, $*G_2$, ...$*G_{32}$ for preparing the positions for the bits of the address information to be exchanged are previously produced by the system changeover unit CCSL 6 and the system changeover decoder CCSL DECODE 51*a*, thus shortening the access time.

Figure 12:
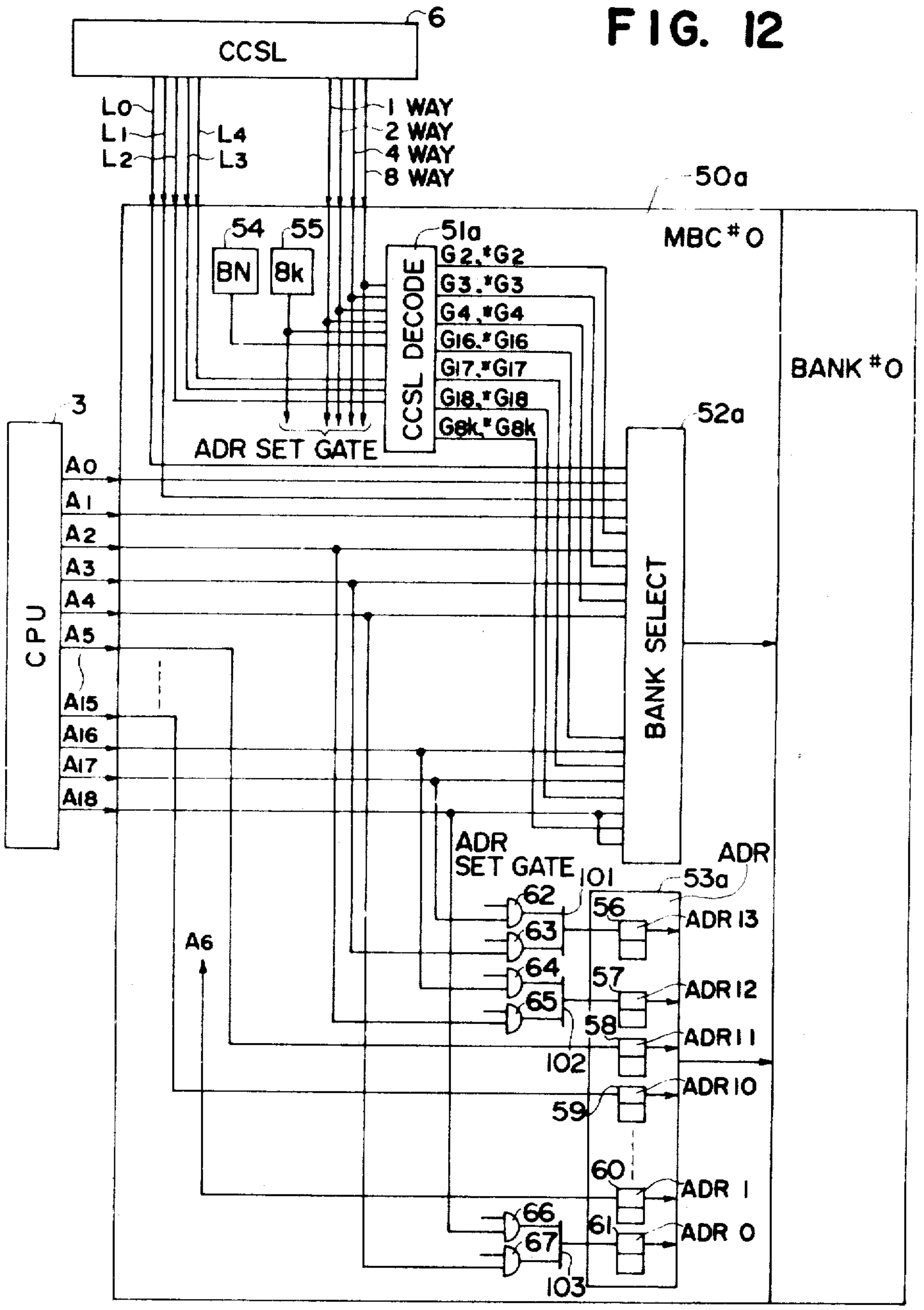
FIG. 12 illustrates one example of the construction of a memory bank control unit (MBC No. 0) depicted in FIG. 11.
Figure 13:
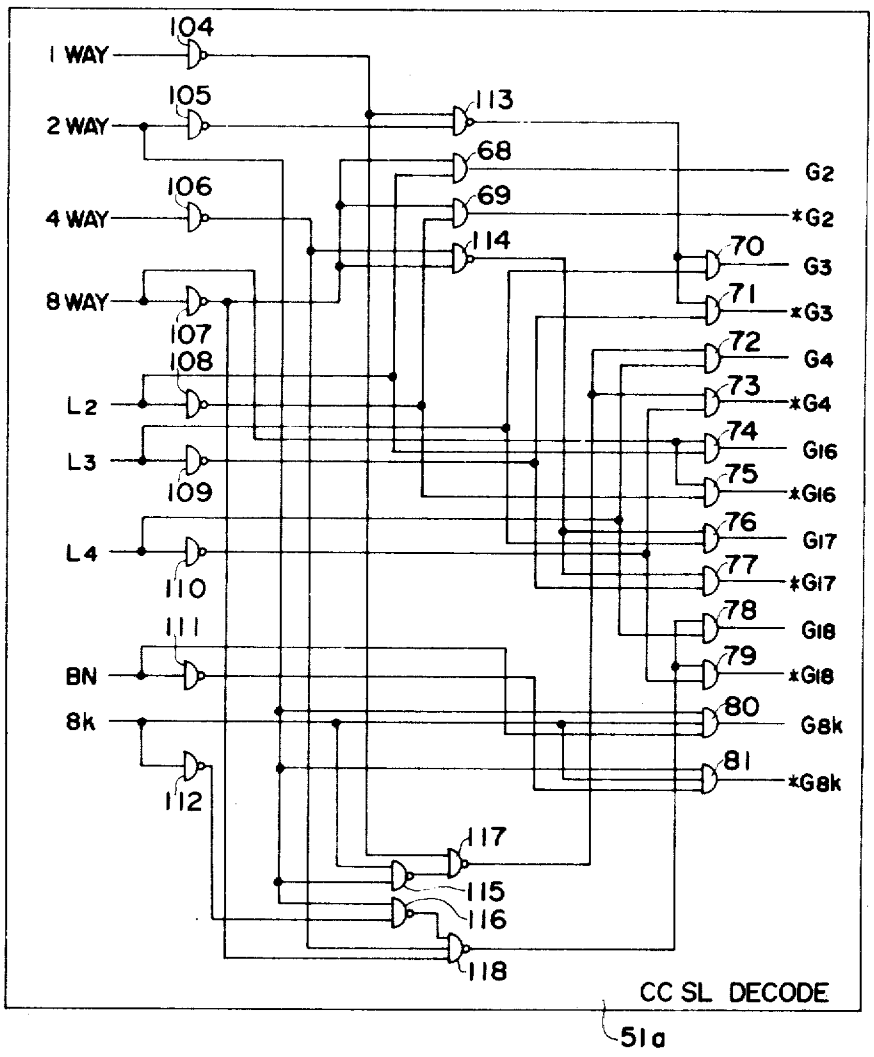
FIG. 13 is a circuit diagram illustrating one example of a system change-over decoder (CCSL DECODE) shown in FIG. 12.
Figure 14:
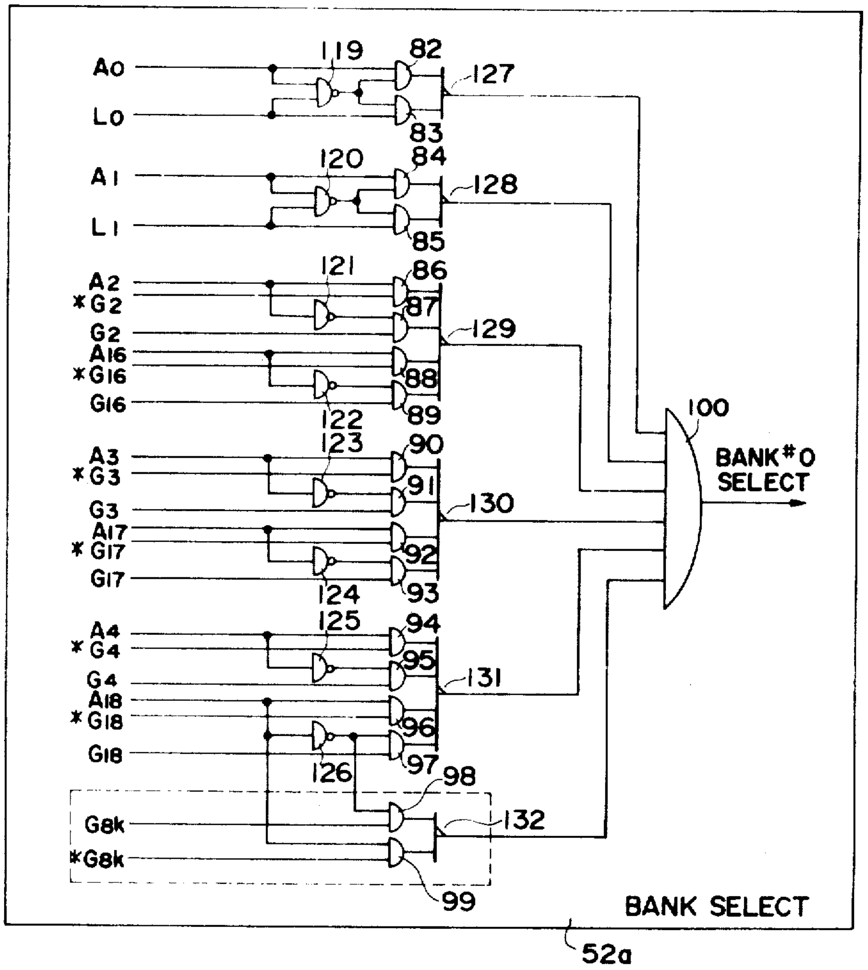
FIG. 14 is a circuit diagram illustrating one example of a bank selector unit depicted in FIG. 12.

FIGS. 12 to 14 illustrate in detail the circuit of FIG. 11, FIG. 12 showing its general construction and FIGS. 13 and 14 being detailed circuit diagrams of the system changeover decoder 51*a* and the bank selector circuit 52*a*, respectively.

In the figures, reference numerals 3, 6, 50*a*, 51*a*, 52*a* and 53*a* correspond to those in FIG. 11 respectively. 54 indicates a BN signal source for producing the output 1 in the case of the arrangement such as the type (II) in FIG. 10; 55 refers to an 8K signal source for producing a signal designating 8K words; 56 to 61 identify flip-flop circuits in which address information for making access to an address in each bank is set; 62 to 100 specify AND gate circuits; 101 to 103 represent OR gate circuits; 104 to 126 refer to NAND gate circuits; 127 to 132 relate to NOR gate circuits; $L_0$ to $L_4$ identify bank address information; 1-way, specify to 8-way information indicating the interleave number; $G_2$,$*G_2$ to $G_{32}$, $*G_{32}$ refer to gate signals for gate control; and $A_0$ to $A_{18}$ identify address information derived from the data processing unit.

In FIG. 12, the data processing unit 3 designates the respective bits $A_0$ to $A_{18}$ of the address information and, at the same time, provides the access demand signal.

Before this, bank address information ($L_0$ to $L_4$) for establishing the bank address is applied to each bank from the system changeover unit CCSL 6 corresponding to the overall arrangement of the system ($L_0$ to $L_4$ being all 0 for the bank BANK No. 0) and 1-way, 2-way, 4-way and 8-way are applied in accordance with the interleave number. Further, in the case of the bank capacity being 8Kwords X2 as in the type (II) shown in FIG. 10, both 8K and BN signals are produced.

As described previously in connection with FIG. 10 for the bit exchange operation, the positions at which six bits $A_2$ to $A_4$ and $A_{16}$ to $A_{18}$ in the address information from the central processing unit CPU 3 are set in the address register 53*a* (the flip-flop circuits 56 to 61) for memory address designation are changed according to the interleave number, the bank capacity and so on, so that the positions for the six bits to be set in are controlled by the signal (1-way to 8-way) representing the interleave number and the signal 8K representing whether the bank capacity is 8Kwords. This is shown by address register set gate circuits ADR SET GATE 62 to 67 and 101 to 103.

Similarly, the six bits are used or not used as bank select bits for bank selection depending upon the interleave number, the bank capacity and so on, and further, practical bank selection is achieved according to what bank address is set in the bank by the information $L_0$ to $L_4$. To perform this, the signals $G_2$, $*G_2$, ... are produced in the system changeover decoder CCSL DECODE 51*a* by the signals 1-way to 8-way indicating the interleave number, the bank address information $L_0$ to $L_4$ and the bank capacity signals BN and 8K and the signals $G_2$, $*G_2$, ... thus obtained are applied to the bank selector circuit BANK SELECT 52*a*.

The bank capacity signals BN and 8K are derived from the signal sources 54 and 55 when the bank capacity is 8Kwords X2 and this is carried out by setting a switch (not shown) in the bank control unit 50*a*. It is also possible to arrange such that the signal sources BN and 8K are started by the system changeover unit CCSL 6.

The gate signals $G_2$, $G_3$, $G_4$, $G_{16}$, $G_{17}$ and $G_{18}$ become outputs 1 under the conditions that the bits $A_2$, $A_3$, $A_4$, $A_{16}$, $A_{17}$ and $A_{18}$ are respectively used for bank selection in accordance with such a table as depicted in FIG. 10. The signals marked with * are those not-signals and a gate signal $G_{8K}$ becomes an output 1 in the case of the type (II) and a signal $*G_{8K}$ is its not-signal.

A logical equation for producing the signal $G_2$ is as follows:

$$G_2 = (1\text{-way} + 2\text{-way} + 4\text{-way}) \cdot L_2$$

The case of the type (II) in FIG. 10 is covered by the condition of 2-way. Similarly, logical equations for the respective signals are as follows:

$*G_2 = (1\text{-way} + 2\text{-way} + 4\text{-way}) \cdot *L_2$
$G_{16} = 8\text{-way} \cdot L_2$
$*G_{16} = 8\text{-way} \cdot *L_2$
$G_3 = (1\text{-way} + 2\text{-way}) \cdot L_3$
$*G_3 = (1\text{-way} + 2\text{-way}) \cdot *L_3$
$G_{17} = (4\text{-way} + 8\text{-way}) \cdot L_3$
$*G_{17} = (4\text{-way} + 8\text{-way}) \cdot *L_3$
$G_4 = (1\text{-way} + 2\text{-way} \cdot 8K) \cdot L_4$
$*G_4 = (1\text{-way} + 2\text{-way} \cdot 8K) *L_4$
$G_{18} = (2\text{-way} \cdot *8K + 4\text{-way} + 8\text{-way}) \cdot L_4$
$*G_{18} = (2\text{-way} \cdot *8K + 4\text{-way} + 8\text{-way}) \cdot *L_4$
$G_{8K} = 2\text{-way} \cdot 8K \cdot BN$
$*G_{8K} = 2\text{-way} \cdot 8K \cdot *BN$ In FIG. 13, there are shown logical circuits for producing the signals $G_2$ to $*G_{8K}$ in accordance with the above logical equations.

For generating the signal, for example, $G_2$, a signal $\overline{8\text{-way}}$ from the NAND circuit 107 and the signal $L_2$ are supplied to the AND circuit 68. From the fact that since 1-way + 2-way + 4-way + 8-way = 1, 1-way + 2-way + 4-way = $\overline{8\text{-way}}$, it will be seen that the above agrees with the aforementioned logical equation for the generation of the signal $G_2$.

In the case of the signal $G_{8K}$, the conditions for the AND circuit 80 are that the signals 2-way, 8K and BN are 1 respectively and it will be seen that this agrees with the aforesaid logical equation for generating the signal $G_{8K}$. For the sake of brevity, no description will be given of the other signals.

The circuit shown in FIG. 13 is used as the system changeover decoder CCSL DECODE 51*a* of FIG. 12 for bank selection together with the respective bits $A_2$, $A_3$, $A_4$, $A_{16}$, $A_{17}$ and $A_{18}$ of the address information derived from the data processing unit CPU. One example of the circuit construction of the bank selector circuit BANK SELECT 52*a* in FIG. 12 is shown in FIG. 14. FIG. 14 is an example for selecting the bank BANK No. 0 and similar circuits are provided for selecting the other banks BANK No. 1 and so on.

In FIG. 14, the NAND gate circuit 119, the AND gate circuits 82 and 83 and the NOR gate circuit 127 which are supplied with the bits $A_0$ and $L_0$ are expressed by "not" of the exclusive "or" of the bits $A_0$ and $L_0$, that is, $\overline{\overline{A_0} \cdot L_0 + A_0 \cdot \overline{L_0}}$, providing the condition that the bits $A_0$ and $L_0$ agree with each other.

The NAND gate circuits 121 and 122, the AND gate circuits 86, 87, 88 and 89 and the NOR gate circuit 129 which are supplied with the bits $A_2$ and $A_{16}$ and the signals $G_2$, $*G_2$, $*G_{16}$ and $G_{16}$ express:

$$\overline{A_2 \cdot *G_2 + \overline{A_2} \cdot G_2 + A_{16} \cdot *G_{16} + \overline{A_{16}} \cdot G_{16}}$$

providing the condition which detects agreement of the signal $G_2$ with the bit $A_2$ or the signal $G_{16}$ with the bit $A_{16}$. Namely, this implies that when agreeing with the signal $G_2$, the bit $A_2$ is used for bank selection and that when agreeing with the signal $G_{16}$, the bit $A_{16}$ is used for bank selection.

Further, a broken-line block corresponds to bank selection in the case of the type (II) in FIG. 10 and expresses:

$$\overline{\overline{A_{18}} \cdot G_{8K} + A_{18} \cdot *G_{8K}}$$

providing the condition that the bit $A_{18}$ agrees with the signal $G_{8K}$.

Turning back to FIG. 12, bank selection is carried out by the bank selector circuit BANK SELECT 52*a* in accordance with a predetermined instruction signal derived from the system changeover unit CCSL 6.

As has been described in the foregoing, in the present invention the memory system changeover unit CCSL 6

1. indicates addresses actually allotted to the modules or banks respectively placed under the control of the respective memory access control units (by the information $L_{00}$ to $L_{31}$ shown in FIG. 8A or $L_0$ to $L_4$ in FIG. 12) and 2. indicates interleave numbers actually designated for the modules or banks respectively placed under the control of the respective memory access control units (by the signals $W_0$ to $W_3$ shown in FIG. 8A and those 4-way, 8-way, 16-way and 32-way in FIG. 8B or those 1-way, 2-way, 3-way and 4-way in FIG. 12) to the respective memory access control units in accordance with the memory arrangement actually employed. Then, based on the instructions from the memory access control units, the address information derived from the access unit such as the data processing unit is subjected to processing such as bit exchange and so on and the module and/or bank containing the address designated by the address information is correctly determined. Consequently, the aforesaid memory arrangement can be readily altered without the necessity of adding a change of the hardware to the memory access control units in response to each change in the aforesaid memory arrangement.

Further, the memory capacity for one module or bank can be controlled in a variable manner by the exchange of the bits of the address information as illustrated, for example, in FIGS. 4K and 4Q.

Numerous changes may be made in the above described control system and different embodiments of the invention may be made without departing from the spirits thereof; therefore, it is intended that all matter contained in the foregoing description and in the accompanying drawings shall be interpreted as illustrative and not in a limiting sense.

We claim as our invention:

1. A memory arrangement control system comprising:

a. a memory having a plurality of independently accessible memory units;

b. each of said plurality of independently accessible memory units and storage portions within each memory unit being designated by an address;

c. address control means for continuously addressing in parallel a combination of an integral multiple number of said memory units in accordance with an interleave signal; and d. means responsive to the interleave signal for varying the combination of memory units by translating the original address indicative of a particular memory unit into a new address corresponding to the selected combination of memory units.

2. A memory arrangement control system according to claim 1, wherein one of said plurality of independently accessible memory units is designated by predetermined bits of address information given in the form of a binary number and an address in the designated memory unit is designated by the remaining bits.

3. A memory arrangement control system according to claim 1, wherein there is included means for determining an interleave number having a minimum unit of $2^P$way where P is a desired positive integer including zero, and means for determining access to each of said memory units by utilizing bits arranged by incorporating a predetermined number of bits of the address information except bits up to $2^{P-1}$ position from the least significant bit thereof into a predetermined number of bits of the address information counting from the most significant bit thereof and by utilizing the bits up to $2P^{-}1$ position from the least significant bit.

4. A memory arrangement control system according to claim 1, wherein there is included means for determining an interleave number having a minimum unit of $2^P$way where P is a desired positive integer including zero, and said address control means determining access to each of said memory units by utilizing bits arranged by predetermined exchange of a predetermined number of bits of the address information counting from the most significant bit thereof with a predetermined number of bits of the address information except bits up to $2^{P-1}$ position from the least significant bit thereof and by utilizing the bits up to $2^{P-1}$ position from the least significant bit.

5. A memory arrangement control system according to claim 1, wherein one of said plurality of independently accessible memory units is designated by predetermined bits of address information given in the form of a binary number; an address in the designated memory unit is designated by the remaining bits; and said varying means for varying the order of said predetermined bits in accordance with the memory capacity of each of the memory units, thereby to designated one of the independently accessible memory units.

6. A memory arrangement control system according to claim 5, wherein there is included means for determining an interleave number having a minimum unit of $2^P$way where P is a positive integer including zero, said varying means responsive to the bit of $2^P$ position of the address information for designating selectively one of the plurality of memory units.

7. A memory arrangement control system according to claim 1, wherein there is included a memory system changeover unit for providing an interleave number for each of said memory units, and a plurality of memory access control units responsive to the interleave number for controlling said memory units.

8. A memory arrangement control system according to claim 1, wherein addresses allotted to said memory units held under the control of a plurality of memory access control units are designated by a memory system changeover unit.

9. A memory arrangement control system according to claim 8, wherein the desired memory capacity of each of said memory units is controlled in accordance with instruction signals derived from said plurality of memory access control units.

10. A memory arrangement control system according to claim 8, wherein said memory access control unit designates one of the independently accessible memory units by agreement of the predetermined bits designated in accordance with the interleave signal and/or the memory capacity of said one memory unit, with the address allotted to said one memory unit.

11. A memory arrangement control system according to claim 8, wherein there is included means for providing at least one gate control signal indicating the designated interleave signal and/or the memory capacity of the designated memory unit and the address allotted to the memory unit, and said translating means including means for exchanging bits of the address information derived from a data processing unit in response to the gate control signal.

12. A memory arrangement control system as claimed in claim 1, wherein said address control means is operative in a first mode for addressing a combination of an integral number of memory units and in a second mode of operation for addressing a combination of memory units including a fraction of one of said memory units.

13. A memory arrangement control system comprising:

a. a memory having a plurality of independently accessible memory units;

b. each of said plurality of independently accessible memory units and the storage portions within each memory unit being designated by an address;

c. address control means for continuously addressing in parallel a combination of memory units including at least one fraction of one memory unit, selected in accordance with an interleave signal; and d. means responsive to the interleave signal for varying the combination of memory units by translating the original address indicative of a particular memory unit into a new addres corresponding to the selected combination of memory units.

* * * * *